United States Patent

Ogawa

(10) Patent No.: US 9,588,711 B2
(45) Date of Patent: Mar. 7, 2017

(54) COMMUNICATION APPARATUS AND CONTROL METHOD THEREOF

(71) Applicant: CANON KABUSHIKI KAISHA, Tokyo (JP)

(72) Inventor: Katsuya Ogawa, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 582 days.

(21) Appl. No.: 13/768,800

(22) Filed: Feb. 15, 2013

(65) Prior Publication Data

US 2013/0231047 A1 Sep. 5, 2013

(30) Foreign Application Priority Data

Mar. 5, 2012 (JP) ................................. 2012-048623

(51) Int. Cl.
*H04B 5/00* (2006.01)
*G06F 3/06* (2006.01)

(52) U.S. Cl.
CPC ......... *G06F 3/0647* (2013.01); *H04B 5/0031* (2013.01)

(58) Field of Classification Search
CPC ............................ H04B 5/0031; G06F 3/0647
USPC .................................................. 455/41.1, 41.2
See application file for complete search history.

(56) References Cited

U.S. PATENT DOCUMENTS

| 2002/0097262 | A1 | 7/2002 | Iwase et al. ................... 345/744 |
| 2005/0164748 | A1 | 7/2005 | Kitaji ............................ 455/572 |
| 2008/0207128 | A1* | 8/2008 | Mikko ..................... G06F 9/445 455/41.2 |
| 2011/0070834 | A1* | 3/2011 | Griffin ................. G06K 7/0008 455/41.1 |
| 2012/0150808 | A1* | 6/2012 | Hubner ............... G06F 11/1464 707/652 |
| 2013/0005246 | A1* | 1/2013 | Waters ..................... H04B 5/02 455/41.1 |

(Continued)

FOREIGN PATENT DOCUMENTS

| EP | 2 421 234 A1 | 2/2012 | |
| JP | 2002-202870 | 7/2002 | .............. B41J 29/00 |

(Continued)

OTHER PUBLICATIONS

JP Office Action dated Oct. 26, 2015 issued in JP Application No. 2012-048623.

*Primary Examiner* — Wesley Kim
*Assistant Examiner* — Raj Chakraborty
(74) *Attorney, Agent, or Firm* — Fitzpatrick, Cella, Harper & Scinto

(57) ABSTRACT

A communication apparatus includes a wireless communication unit which makes a wireless communication with a wireless apparatus, and is configured to read out data from a memory included in the wireless communication unit when electric power is not supplied from a power supply to the wireless communication unit. The communication apparatus specifies storage target data to be stored in the memory from those managed by the communication apparatus. The communication apparatus then saves the specified storage target data in the memory. The communication apparatus reads out data, which is saved in the memory, by the wireless communication unit in a state in which electric power is not supplied from the power supply to the wireless communication unit, and outputs the readout data to the wireless apparatus.

16 Claims, 24 Drawing Sheets

(56) References Cited

U.S. PATENT DOCUMENTS

2013/0132347 A1* 5/2013 Chen .................. G06F 11/1458
707/648

FOREIGN PATENT DOCUMENTS

| | | | |
|---|---|---|---|
| JP | 2004-200840 A | 7/2004 | |
| JP | 2005-217621 | 8/2005 | ............... G11C 8/00 |
| JP | 2007-079639 | 3/2007 | ............... G06F 3/12 |
| JP | 2009-177596 | 8/2009 | .......... H04M 1/2745 |
| WO | WO 2010/029446 A1 | 3/2010 | |

* cited by examiner

MFP OUTER APPEARANCE VIEW

MFP TOP VIEW

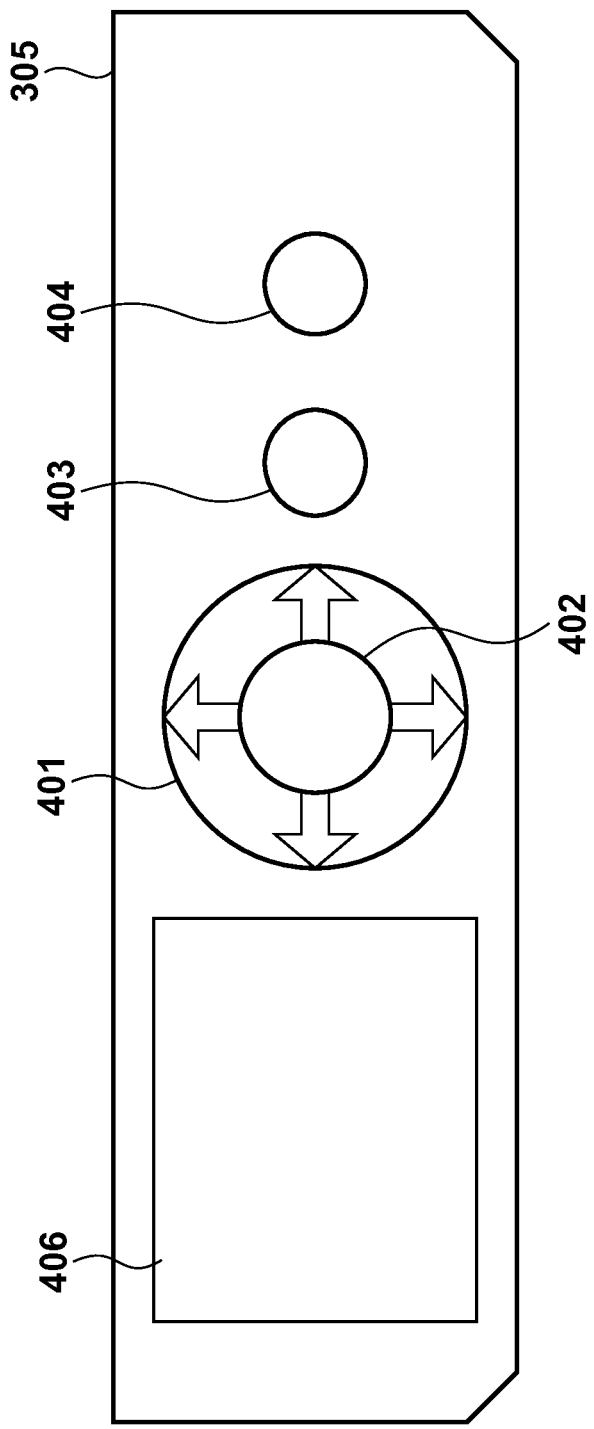

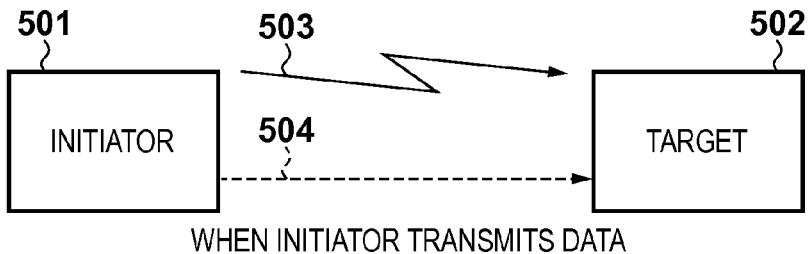
FIG. 5A  WHEN INITIATOR TRANSMITS DATA
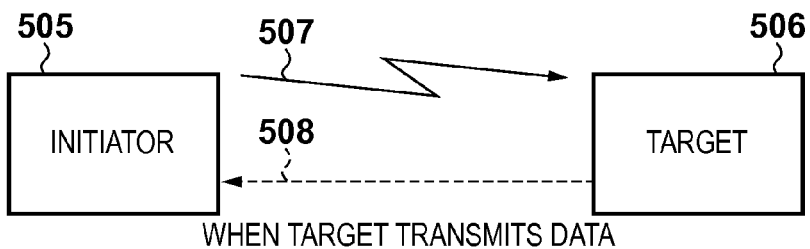
FIG. 5B  WHEN TARGET TRANSMITS DATA
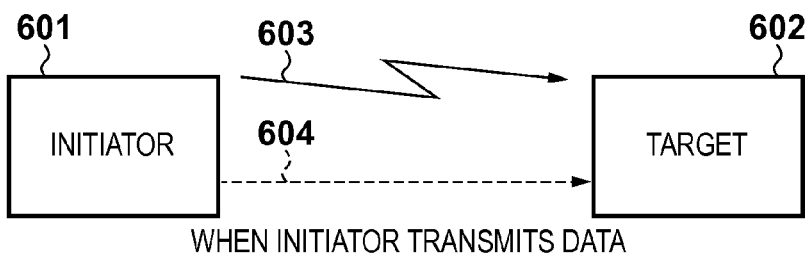
FIG. 6A  WHEN INITIATOR TRANSMITS DATA
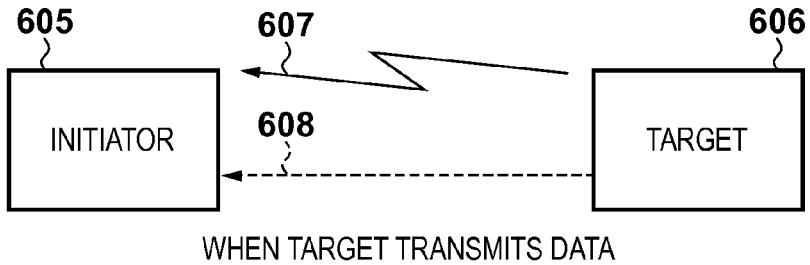
FIG. 6B  WHEN TARGET TRANSMITS DATA F I G. 10
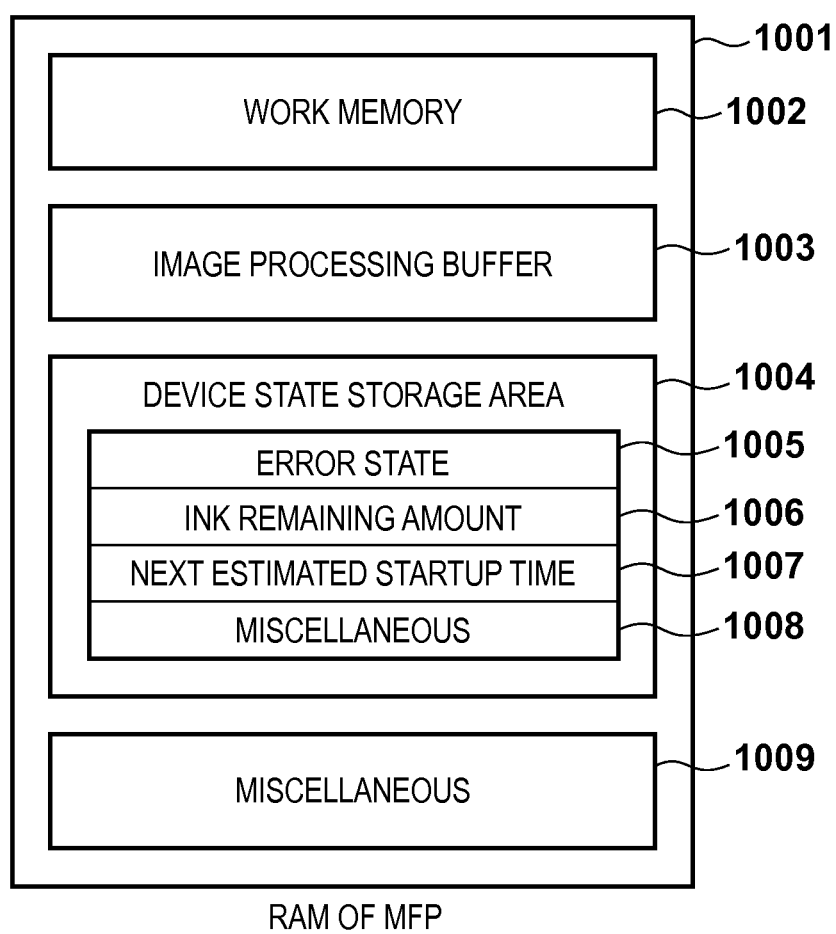

BACKUP PRINTING STANDBY SCREEN

BACKUP PRINTING AUTHENTICATION SCREEN

BACKUP PRINTING AUTHENTICATION FAILURE SCREEN

BACKUP PRINTING SCREEN

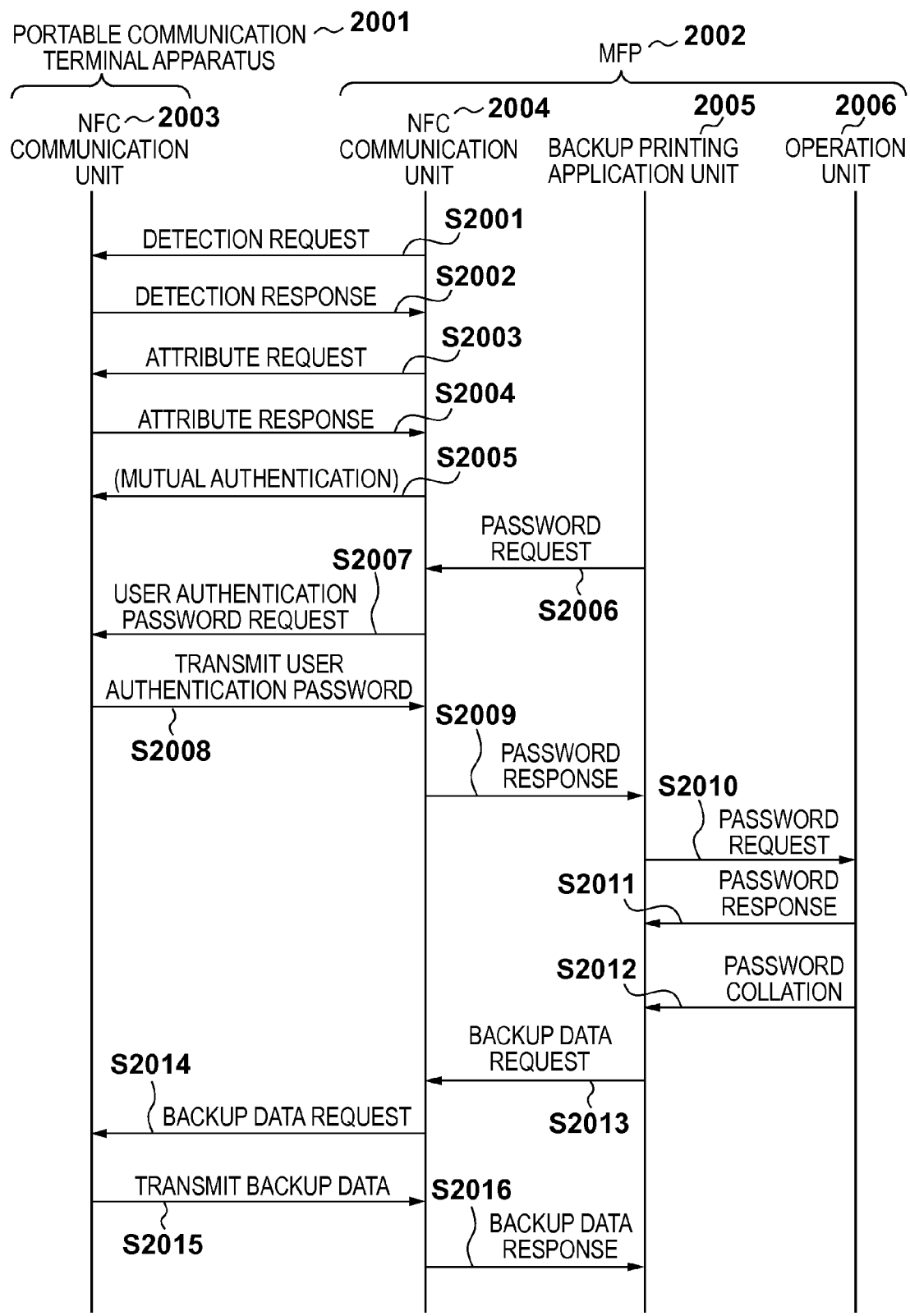

INCOMING CALL HISTORY BACKUP

OUTGOING CALL HISTORY BACKUP

MAIL HISTORY BACKUP

POSITION INFORMATION BACKUP

FIG. 25A

COMMUNICATION HISTORY

YY/MM/DD HH:MM XXXX XXX 090-XXXX-XXXX
YY/MM/DD HH:MM UNREGISTERED 03-XXXX-XXXX
YY/MM/DD HH:MM XXXX XXX 090-XXXX-XXXX
. . . . . .

PRINT EXAMPLE OF INCOMING CALL HISTORY

FIG. 25B

RECEIVED MAIL HISTORY

SENDER : XXXXXX   TITLE : XXXXXX
CONTENTS : XXXXXXXXXXXXXXXXXXXXX...
SENDER NUMBER : 080-XXXX-XXXX
SENDER : XXXXXX   TITLE : XXXXXX
CONTENTS : XXXXXXXXXXXXXXXXXXXXX...
SENDER NUMBER : 080-XXXX-XXXX
SENDER : XXXXXX   TITLE : XXXXXX
CONTENTS : XXXXXXXXXXXXXXXXXXXXX...
SENDER NUMBER : 080-XXXX-XXXX
SENDER : XXXXXX   TITLE : XXXXXX
CONTENTS : XXXXXXXXXXXXXXXXXXXXX...
SENDER NUMBER : 080-XXXX-XXXX
. . . .

PRINT EXAMPLE OF RECEIVED MAIL HISTORY

COMMUNICATION APPARATUS AND CONTROL METHOD THEREOF

BACKGROUND OF THE INVENTION

Field of the Invention

The present invention relates to a communication apparatus and a control method thereof which cooperates with that communication apparatus and, more particularly, to a communication apparatus capable of short distance wireless communications, and a control method thereof which cooperates with that communication apparatus.

Description of the Related Art

A portable communication terminal such as a smartphone is used not only as a communication tool to perform telephone calls and mail messages but also to use various applications, but consume a large amount of power depending on communications, GPS, and applications.

On the other hand, a communication device which makes communications based on a short distance wireless communication function such as NFC (Near Field Communication) which exchanges data by electromagnetic waves is available (Japanese Patent Laid-Open No. 2004-200840). According to Japanese Patent Laid-Open No. 2004-200840, in 1:1 wireless communications, data stored in a memory in an NFC unit can be exchanged in response to a request of the side (initiator) which generates electromagnetic waves even in a state no electric power is supplied to the side (target) which does not generate any electromagnetic wave.

When a battery for a portable communication terminal is dead or the portable communication terminal has gone down, the user loses a communication tool. In this case, an alternate tool such as a public phone is prepared, but most users do not separately memorize contact information registered in the portable communication terminal. For example, a certain user cannot be in contact during important negotiation, resulting in inconvenience.

The present invention provides, as its object, an apparatus which securely and easily outputs information managed in a portable communication terminal to an external apparatus even in unexpected power failure.

SUMMARY OF THE INVENTION

In order to achieve the above object, a communication apparatus according to the present invention comprises the following arrangement. That is, a communication apparatus comprises: a wireless communication unit which makes a wireless communication with a wireless apparatus, and is configured to read out data from a memory included in the wireless communication unit when electric power is not supplied from a power supply to the wireless communication unit; a specifying unit configured to specify storage target data to be stored in the memory from data managed by the communication apparatus; a saving unit configured to save the target data specified by the specifying unit in the memory; and an output unit configured to read out data, which is saved in the memory by the saving unit, by the wireless communication unit in a state in which electric power is not supplied from the power supply to the wireless communication unit, and to output the readout data to the wireless apparatus.

According to the present invention, information managed in a portable communication terminal can be securely and easily output to an external apparatus even in unexpected power failure.

Further features of the present invention will become apparent from the following description of exemplary embodiments (with reference to the attached drawings).

BRIEF DESCRIPTION OF THE DRAWINGS

FIG. 4 is a view showing an example of an operation unit of the MFP;

FIG. 5A is a conceptual view of a passive mode in NFC communications;

FIG. 5B is a conceptual view of the passive mode in NFC communications;

FIG. 6A is a conceptual view of an active mode in NFC communications;

FIG. 6B is a conceptual view of the active mode in NFC communications;

FIG. 10 is a view showing the configuration of a RAM of the MFP;

FIG. 20 is a chart showing an example of the processing sequence of backup printing;

FIG. 25A is a view showing an example of an output result of the backup printing; and FIG. 25B is a view showing an example of an output result of the backup printing.

DESCRIPTION OF THE EMBODIMENTS

Embodiments of the present invention will be exemplarily described in detail hereinafter with reference to the drawings. However, relative layouts of components, display screens, and the like described in the embodiment do not limit the scope of the present invention unless otherwise specified.

This embodiment will explain a backup data output system of a portable communication terminal using a portable communication terminal apparatus and printing apparatus. More specifically, the portable communication terminal apparatus saves pre-set backup target data as backup data at a predetermined timing. A saving destination is a nonvolatile storage area (nonvolatile memory) which is incorporated in a short distance wireless communication unit such as NFC (Near Field Communication) and in which data can be written. The printing apparatus receivers data from the portable communication terminal apparatus to which no electric power is supplied (for example, in an unexpected power failure state) via the NFC. Next, the printing apparatus authenticates the user based on the received data. When the authentication has succeeded, the printing apparatus forms and prints the received data as an image. When the authentication has failed, contact information of the user of the portable communication terminal apparatus is displayed.

Note that the short distance wireless communication means a wireless communication represented by the NFC, a communication range of which is a relatively small predetermined range (for example, 1 m to several cm).

Figure 1:
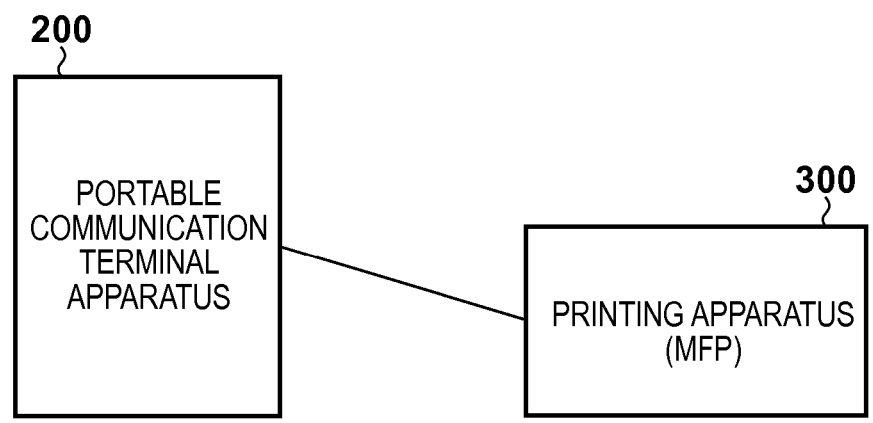
FIG. 1 is a diagram showing an example of the configuration of a wireless communication system.

FIG. 1 shows the configuration of the backup data output system of the portable communication terminal apparatus.

A portable communication terminal apparatus 200 is an apparatus which has a short distance wireless communication unit. The portable communication terminal apparatus 200 is not particularly limited, and a personal information terminal such as a PDA (Personal Digital Assistant), mobile phone, digital camera, and the like may be used as long as they can handle data to be printed. A printing apparatus (MFP) 300 is not particularly limited as long as it has an output function such as a print function, and it may additionally have a reading function, FAX function, and telephone function. In this embodiment, a Multi Function Printer (MFP) having the reading function will be exemplified. Both of the portable communication terminal apparatus 200 and MFP 300 have short distance wireless communication units using the NFC. Even when no electric power is supplied to the portable communication terminal apparatus 200, when the portable communication terminal apparatus 200 is moved closer to the MFP 300 within a predetermined distance range that allows the NFC communications, short distance wireless communications can be made. The MFP 300 may be connected to an external network, personal computer, and display via a communication unit different from the NFC.

Figure 2:
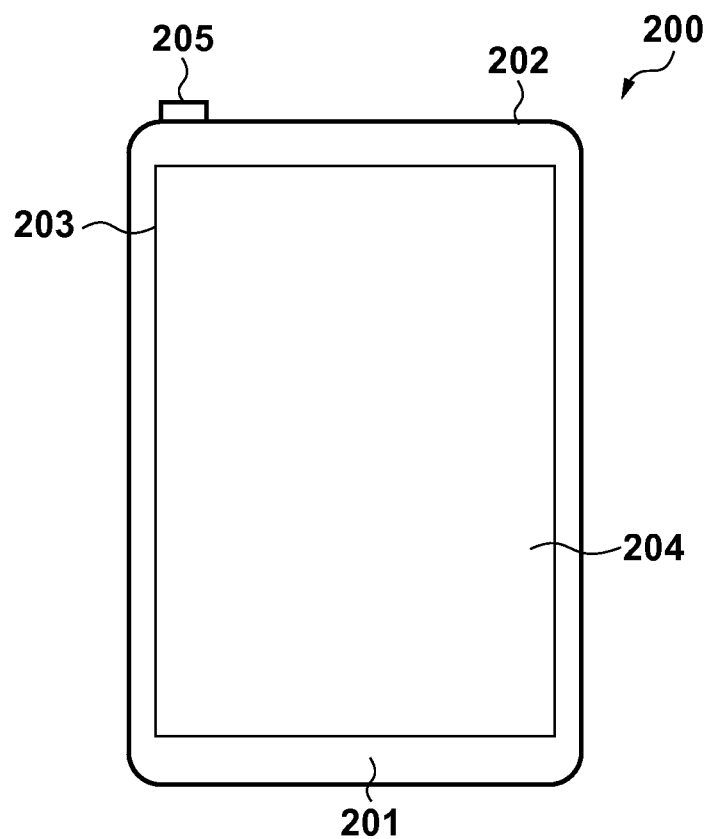
FIG. 2 is a view showing the outer appearance of a portable communication terminal apparatus.

FIG. 2 shows the outer appearance of the portable communication terminal apparatus 200.

This embodiment will exemplify a smartphone. The "smartphone" means a multi-function mobile phone which incorporates a camera, network browser, mail function, and the like in addition to mobile phone functions. An NFC unit 201 as a short distance wireless communication unit is a unit required to make communications using the NFC. When the NFC unit 201 is moved closer to a partner NFC unit within a predetermined distance range (for example, about 10 cm), they can communicate with each other in practice.

A WLAN unit 202 is a unit required to make communications via a WLAN, and is arranged inside the portable communication terminal apparatus 200. A display unit 203 is, for example, a display including an LCD type display mechanism. An operation unit 204 includes a touch panel type operation mechanism, and detects pressing information of the user. As a representative operation method, the display unit 203 displays button icons and a software keyboard, and the user presses the operation unit 204, thus issuing a button pressing event. A power key 205 is used to turn on/off a power supply.

Figure 3A:
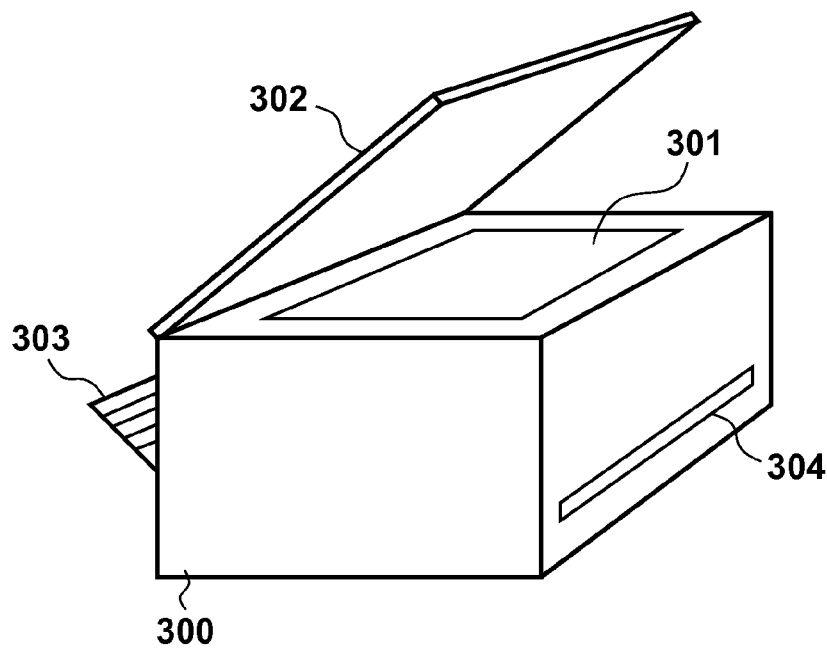
FIG. 3A is a view showing the outer appearance of an MFP.
Figure 3B:
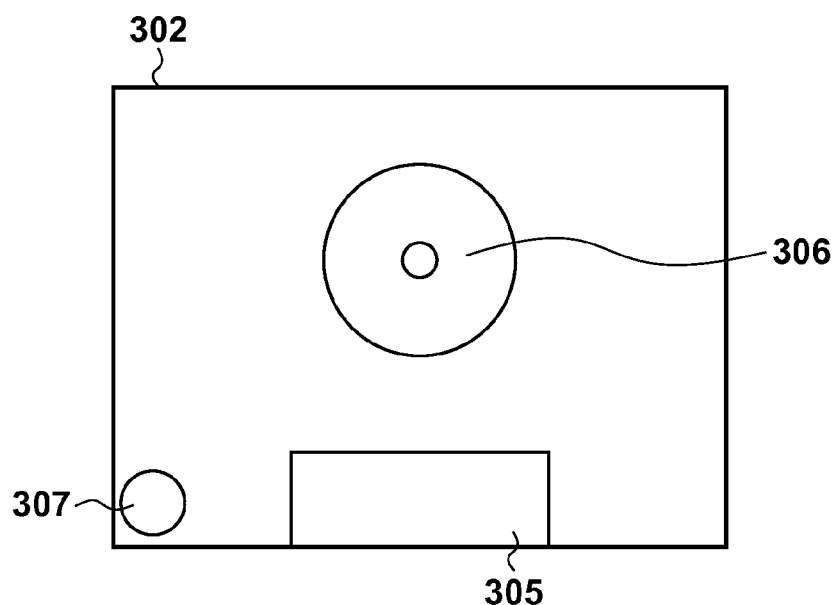
FIG. 3B is a view showing the outer appearance of the MFP.

FIGS. 3A and 3B show the outer appearance of the MFP 300.

This embodiment will exemplify the MFP (Multi Function Printer) having the reading function (scanner). In FIG. 3A, a platen 301 is a glass-like transparent table, which is used to read a document placed on itself using a scanner. A document cover 302 is a cover required to prevent reading light from externally leaking at the time of reading by the scanner. A printing sheet insertion port 303 is an insertion port on which paper sheets of various sizes are set. Paper sheets set on the printing sheet insertion port 303 are conveyed one by one to a printing unit, and are discharged from a printing sheet discharge port 304 after a desired printing operation.

In FIG. 3B, an operation/display unit 305 and NFC unit 306 are arranged on an upper portion of the platen 302. The operation/display unit 305 will be described in detail later with reference to FIG. 4. The NFC unit 306 is a unit required to make short distance wireless communications, and is a place where the portable communication terminal apparatus 200 is approximated to the MFP 300. A predetermined distance (about 10 cm) from the NFC unit 306 is an effective distance of a contact. A WLAN antenna 307 is required to make WLAN communications, and is embedded.

FIG. 4 is a plan view of the operation/display unit 305.

A display unit 406 is a display screen used to display images and a user interface such as an operation menu, and includes, for example, a dot matrix LCD. A four-way selector 401 is used for operations such as cursor movements on the display unit 406. A set key 402 is a key used to make a setting input. A function key 403 is used for operations such as function settings. A start key 404 is used to issue a function execution instruction such as a print start instruction.

The NFC communications will be described below. When proximity communications are made using the NFC units, an apparatus which outputs an RF (Radio Frequency) field first to initiate a communication is called an initiator. Also, an apparatus which responds to a command issued by the initiator to communicate with the initiator is called a target.

A communication mode of the NFC unit includes a passive mode and active mode. In the passive mode, the target responds to a command of the initiator by performing load modulation. On the other hand, in the active mode, the target responds to a command of the initiator by an RF field generated by the target itself.

FIGS. 5A and 5B are conceptual views of the passive mode in the NFC communications.

When data 504 is transmitted from an initiator 501 to a target 502 in the passive mode, as shown in FIG. 5A, the initiator 501 generates an RF field 503. The initiator 501 transmits the data 504 to the target 502 by modulating the RF field 503 by itself.

Also, when data 508 is transferred from a target 506 to an initiator 505 in the passive mode, as shown in FIG. 5B, the initiator 505 generates an RF field 507 in the same manner as in FIG. 5A. The target 506 performs load modulation with respect to the RF field 507, thereby transmitting the data 508 to the initiator 505.

FIGS. 6A and 6B are conceptual views of the active mode in the NFC communications.

When data 604 is transmitted from an initiator 601 to a target 602 in the active mode, as shown in FIG. 6A, the initiator 601 generates an RF field 603. The initiator 601 transmits the data 604 to the target 602 by modulating the RF field 603 by itself. After completion of the data transmission, the initiator 601 stops outputting the RF field 603.

On the other hand, when data 608 is transmitted from a target 608 to an initiator 605 in the active mode, as shown in FIG. 6B, the target 606 generates an RF field 607. The target 606 transmits the data 608 by the RF field 607 generated by itself, and stops outputting the RF field 607 after completion of the transmission.

Figure 7:
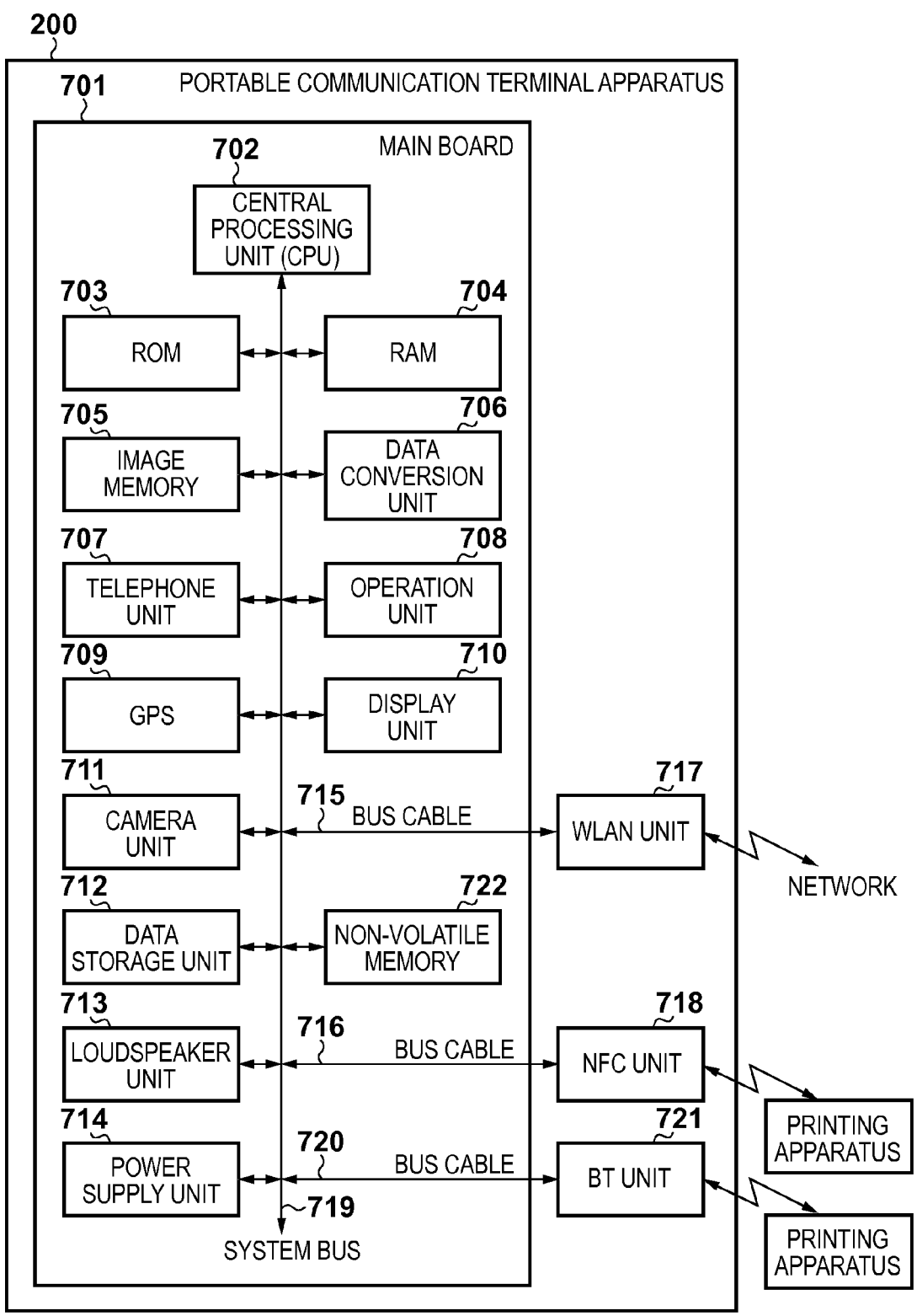
FIG. 7 is a block diagram showing the arrangement of the portable communication terminal apparatus.

FIG. 7 is a block diagram showing the arrangement of the portable communication terminal apparatus 200.

The portable communication terminal apparatus 200 includes a main board 701 which executes main control of the apparatus itself, a WLAN unit 717 which makes WLAN communications, an NFC unit 718 which makes NFC communications, and a BT unit 721 which makes Bluetooth® communications.

In the main board 701, a CPU 702 is a system control unit, and controls the overall portable communication terminal apparatus 200. A ROM 703 stores control programs to be executed by the CPU 702, embedded operating system (OS) program, and the like. In this embodiment, respective control programs stored in the ROM 703 implement software control such as scheduling and task switching under the management of the embedded OS stored in the ROM 703.

A RAM 704 includes an SRAM (Static RAM) or the like, stores data such as program control variables, also stores data such as setting values registered by the user and management data of the portable communication terminal apparatus 200, and is assured with various work buffer areas.

An image memory 705 includes a memory such as a DRAM (Dynamic RAM), and temporarily stores image data received via a communication unit and those which are read out from a data storage unit 712 so as to be processed by the CPU 702. In this case, the communication unit is a collective term of communication functions including the WLAN unit 717, NFC unit 718, and BT unit 721.

A nonvolatile memory 722 includes a memory such as a flash memory, and stores data to be saved even after power-OFF. Such data include, for example, an address book, mail history, incoming/outgoing call history, previously connected device information, and the like. Note that such memory configuration is not limited to this. For example, the image memory 705 and RAM 704 may be shared, or data may be backed up in the data storage unit 712. In this embodiment, the DRAM is used as the image memory 705. However, the present invention is not limited to this since other storage media such as a hard disk and nonvolatile memory may be used.

A data conversion unit 706 executes analysis of a page description language (PDL) and the like, and data conversion such as color conversion and image conversion. A telephone unit 707 controls a telephone line, and realizes telephone communications by processing audio data input/output via a loudspeaker unit 713. An operation unit 708 controls signals of the operation unit 204 (FIG. 2). A GPS (Global Positioning System) 709 acquires position information such as the current latitude and longitude. A display unit 710 electronically controls the display contents of the display unit 203 (FIG. 2), allows various input operations, and can display operation states, status conditions, and the like of the MFP 300.

A camera unit 711 has a function of digitally recording and encoding an image input via a lens. An image captured by the camera unit 711 is saved in the data storage unit 712. The loudspeaker unit 713 realizes a function of inputting or outputting a speech for a telephone function, and also an alarm notification function and the like. A power supply unit 714 is a portable battery, and executes power supply control in the apparatus. A power supply state includes an out-of-battery state in which the battery has no remaining amount, a power-OFF state in which the power key 205 is not pressed, a startup state in which the apparatus is normally started up, and a power saving state in which the apparatus is started up but is set in a power saving mode.

The portable communication terminal apparatus 200 incorporates three communication units required to make wireless communications, and can make WLAN, NFC, and Bluetooth® wireless communications. Thus, the portable communication terminal apparatus 200 makes data communications with another device such as an MFP. This communication unit converts data into packets, and makes packet transmission to the other device. Conversely, the communication unit converts packets coming from another external device into data, and transmits the data to the CPU 702. The WLAN unit 717, NFC unit 718, and BT unit 721 are connected to the main board 701 respectively via bus cables 715, 716, and 720. The WLAN unit 717, NFC unit 718, and BT unit 721 are units required to attain communications compliant with the standards. Details of the NFC unit will be described later with reference to FIG. 9.

The respective components 703 to 714, 717, 718, 721, and 722 in the main board 701 are connected to each other via a system bus 719 managed by the CPU 702.

Figure 8:
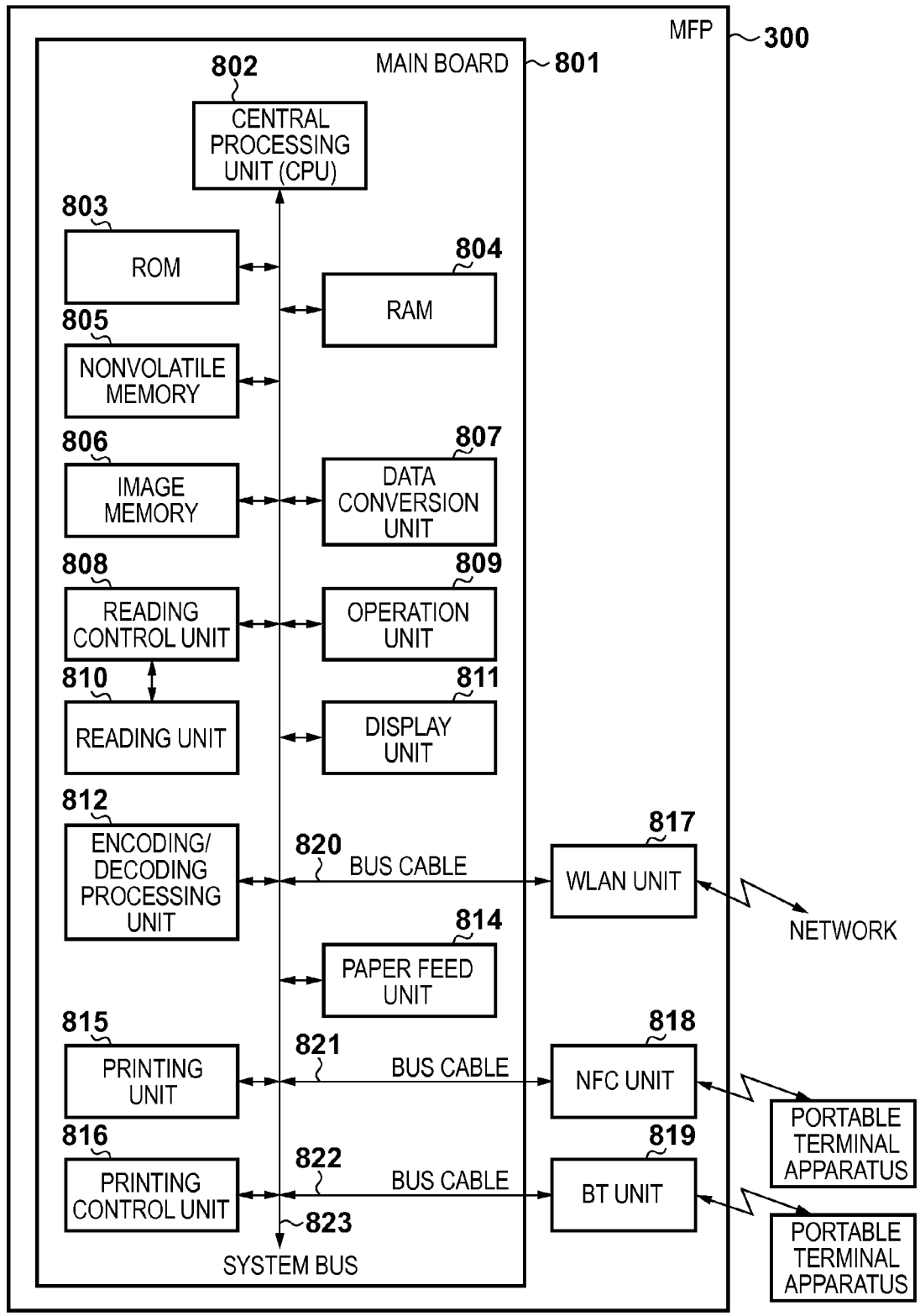
FIG. 8 is a block diagram showing the arrangement of the MFP.

FIG. 8 is a block diagram showing the arrangement of the MFP 300.

The MFP 300 includes a main board 801 which executes main control of the apparatus itself, a WLAN unit 817 which makes WLAN communications, an NFC unit 818 which makes NFC communications, and a BT unit 819 which makes Bluetooth® communications.

In the main board 801, the CPU 802 is a system control unit, and controls the overall MFP 300. A ROM 803 stores control programs to be executed by the CPU 802, an embedded operating system (OS) program, and the like. In this embodiment, respective control programs stored in the ROM 803 implement software control such as scheduling and task switching under the management of the embedded OS stored in the ROM 803. A RAM 804 includes an SRAM (Static RAM), stores data such as program control variables, stores data such as setting values registered by the user and management data of the MFP 300, and is assured with various work buffer areas.

A nonvolatile memory 805 includes a memory such as a flash memory, and stores data to be held even after power-OFF. More specifically, such data include network connection information, user data, and the like. An image memory 806 includes a memory such as a DRAM (Dynamic RAM), and stores image data received via a communication unit, those processed by an encoding/decoding processing unit 812, and those acquired via a memory card controller 516. Also, as in the memory configuration of the portable communication terminal apparatus 200, the present invention is not limited to such specific memory configuration. A data conversion unit 807 executes analysis of a page description language (PDL) and the like, conversion from image data into print data, and the like.

Note that the communication unit is a collective term of communication functions including the WLAN unit 817, NFC unit 818, and BT unit 819.

A reading control unit 808 controls a reading unit 810 to optically read a document by, for example, a CIS sensor (contact image sensor). Next, the reading control unit 808 applies various kinds of image processing such as binarization processing and halftone processing to an image signal converted into electrical image data via an image processing control unit (not shown), thereby outputting high-resolution image data.

An operation unit 809 and display unit 811 correspond to the operation/display unit 305 in FIG. 4. The encoding/decoding processing unit 812 executes encoding/decoding processing and enlargement/reduction processing of image data (JPEG, PNG, etc.) handled by the MFP 300. A paper feed unit 814 holds paper sheets used in printing. A paper sheet can be fed from the paper feed unit 814 under the control of a printing control unit 816. Especially, as the paper feed unit 814, a plurality of paper feed units can be prepared so as to hold a plurality of types of paper sheets in one apparatus. Then, the printing control unit 816 can control to select a paper feed unit used to supply paper sheets.

The printing control unit 816 applies various kinds of image processing such as smoothing processing, printing density correction processing, and color correction to image data to be printed via an image processing control unit (not shown) to convert that image data into high-resolution image data, and outputs the converted data to a printing unit 815. The printing control unit 816 also assumes a role of periodically reading out information of the printing unit 815, and updating information in the RAM 804. More specifically, the printing control unit 816 updates status information such as the remaining amount of an ink tank and a printhead state.

The MFP 300 also incorporates three communication units required to make wireless communications as in the portable communication terminal apparatus 200, and a description of these communication units will not be repeated since their functions are the same. In this case, the WLAN unit 817, NFC unit 818, and BT unit 819 are connected to the main board 801 respectively via bus cables 820, 821, and 822.

Respective components 802 to 819 in the main board 801 are connected to each other via a system bus 823 managed by the CPU 802.

Figure 9:
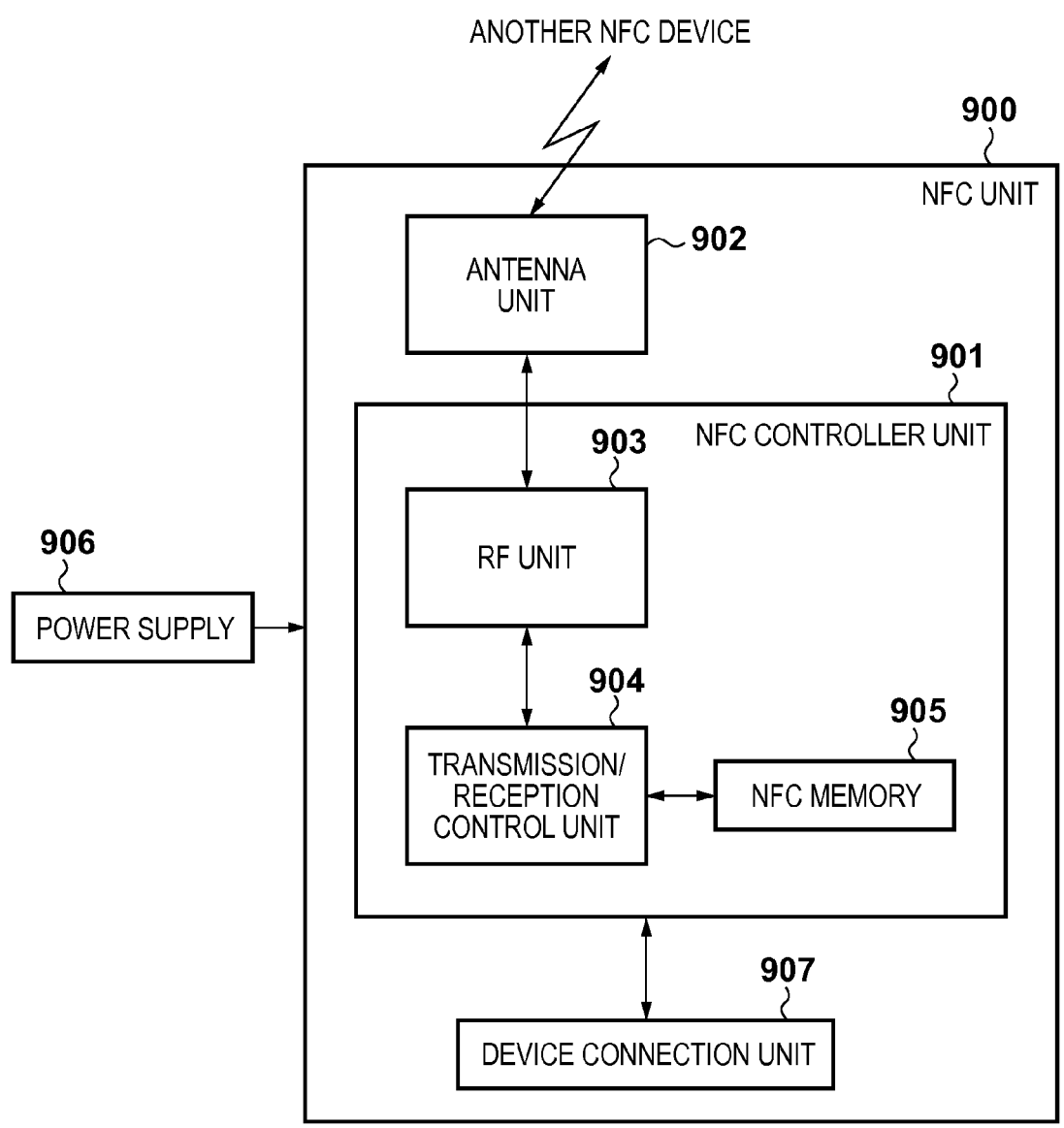
FIG. 9 is a block diagram showing the detailed arrangement of an NFC unit.

FIG. 9 is a block diagram showing details of an NFC unit used in the NFC unit 718 or 818.

FIG. 9 will explain the NFC unit 718 (FIG. 7) or NFC unit 818 (FIG. 8) as an NFC unit 900. The NFC unit 900 includes an NFC controller unit 901, antenna unit 902, RF unit 903, transmission/reception control unit 904, NFC memory 905, power supply 906, and device connection unit 907.

The antenna unit 902 receives electromagnetic waves and carriers from another NFC device (a device incorporating an NFC unit), and transmits electromagnetic waves and carriers to another NFC device. The RF unit 903 has a function of modulating/demodulating an analog signal to a digital signal. The RF unit 903 includes a synthesizer, and controls bands and channels based on frequency assigned data by identifying frequencies of bands and channels.

The transmission/reception control unit 904 executes control associated with transmission/reception such as assembling/disassembling of transmission/reception frames, appending and detection of a preamble, and frame identification. Also, the transmission/reception control unit 904 controls the NFC memory 905 to read/write various data and programs. When the NFC unit operates in the active mode, it receives electric power via the power supply 906 to communicate with a device via the device connection unit 907 and to communicate with another NFC device located within a communication range by carriers (or electromagnetic waves) transmitted/received via the antenna unit 902. When the NFC unit operates in the passive mode, it receives carriers (or electromagnetic waves) from another NFC device via the antenna unit 902 to electric power from that NFC device by electromagnetic induction, and exchanges data via communications with that NFC device by modulating carriers (or electromagnetic waves).

FIG. 10 shows the configuration of the RAM 804 of the MFP 300.

Reference numeral 1001 denotes an entire storage area of the RAM 804. A work memory 1002 is a memory area assured to execute programs. An image processing buffer 1003 is an area used as a temporary buffer for image processing.

A device state storage area 1004 stores various kinds of information associated with the current state of the MFP 300. In this case, various kinds of information include an error state 1005, ink remaining amount 1006, next estimated startup time 1007, and miscellaneous 1008.

The error state 1005 stores states associated with errors of the MFP 300. Such errors include a low-ink alert, out-of-ink error, paper jam error, out-of-paper alert, printed image defect alert, read image defect error, network disconnection alert, and the like. These alerts and errors are associated with degrees of influence on a printing function, degrees of influence on a reading function, and the like. For example, in case of an out-of-ink error, the printing function is not available, but the reading function is available. In case of a network disconnection alert, functions using a network are not available, but setting changes and the reading functions to be performed by the apparatus alone are available.

The ink remaining amount 1006 stores a model number and ink remaining amount of a currently attached ink tank. The model number of the ink tank is updated at an attachment timing of that ink tank. The ink remaining amount 1006 is updated every time ink is used.

The next estimated startup time 1007 stores an estimated startup time of the next startup timing when the power supply is turned off. The startup time of the MFP 300 largely varies depending on states. For example, a power supply state of the MFP 300 includes a hard OFF state, soft OFF state, normal startup state, sleep state, and the like. In the hard OFF state, no electric power is supplied, and when the power supply is turned on to change the hard OFF state to the normal startup state, a long time is required. In the soft OFF state, electric power is supplied to some units, but a main program is not running. In this state, the apparatus can be started up to require a shorter time than the hard OFF state. In the sleep state, since no electric power is supplied to units which require large power consumption, but other programs and mechanisms are active, the normal startup state can be restored quickly. Another variation factor of the startup time includes error states of the apparatus. For example, when many clogged nozzles of an inkjet printhead are detected, the apparatus is started up for the next time after recovery processing for a long time. When the light amount of the scanner is reduced, the apparatus is started up after an adjustment operation. In this manner, the estimated startup time at the next startup timing is decided depending on the state transition of the power supply and the state of the apparatus.

The miscellaneous 1008 stores other device states such as the current memory use amount, hardware temperature, and expendable information. A miscellaneous 1009 stores data other than aforementioned data.

Figure 11:
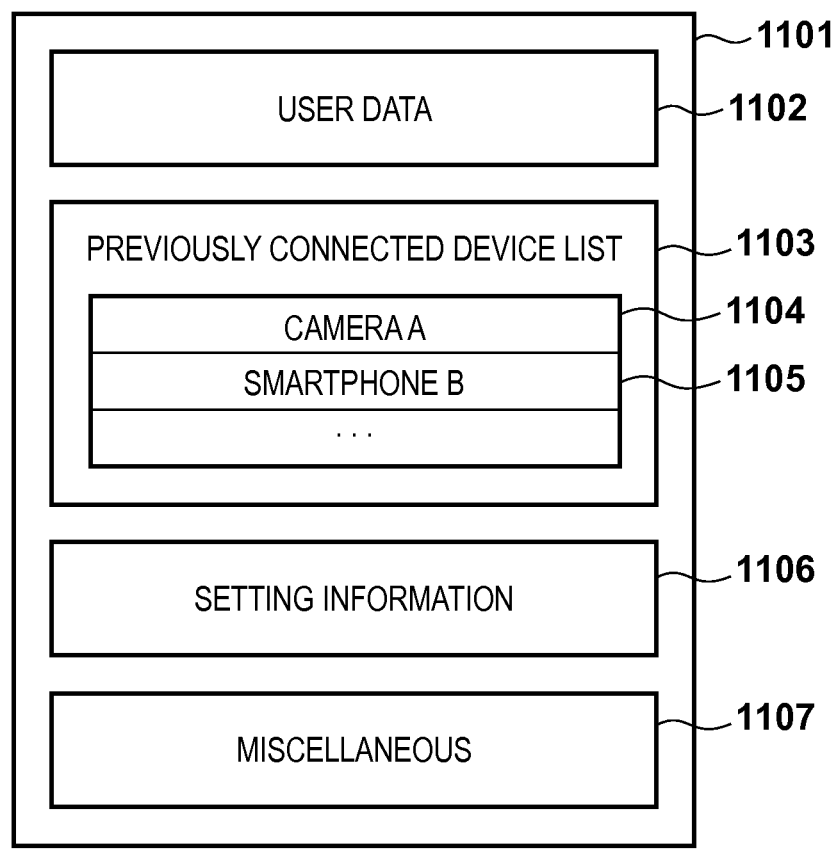
FIG. 11 is a view showing the configuration of a non-volatile memory of the MFP.

FIG. 11 shows the configuration of the nonvolatile memory 805 of the MFP 300.

Reference numeral 1101 denotes an overall storage area of the nonvolatile memory 805. User data 1102 stores information associated with the user, and stores, for example, a FAX telephone number, communication history, network information, and the like. A previously connected apparatus list 1103 stores a list of apparatuses to which the MFP 300 was connected to so far. For example, the list 1103 stores an identifier for the smartphone when the MFP 300 communicates with a smartphone via the NFC. When the MFP 300 was P2P (peer-to-peer)-connected to a smartphone via the WLAN, the list 1103 stores identification information required for connection via the WLAN. More specifically, when WPS (Wi-Fi Protected Setup) is used for the WLAN connection, the list 1103 stores WPS Credential authentication information. When the MFP 300 was connected to a smartphone via Bluetooth, the list 1103 stores OOB authentication information. When the MFP 300 was connected to a server apparatus via a LAN, the list 1103 stores network information of the server apparatus. Setting information 1106 stores setting information of the MFP 300. The setting information includes, for example, menu items such as a print mode, correction information of the inkjet printhead, and the like. A miscellaneous 1107 stores other kinds of nonvolatile information.

Figure 12:
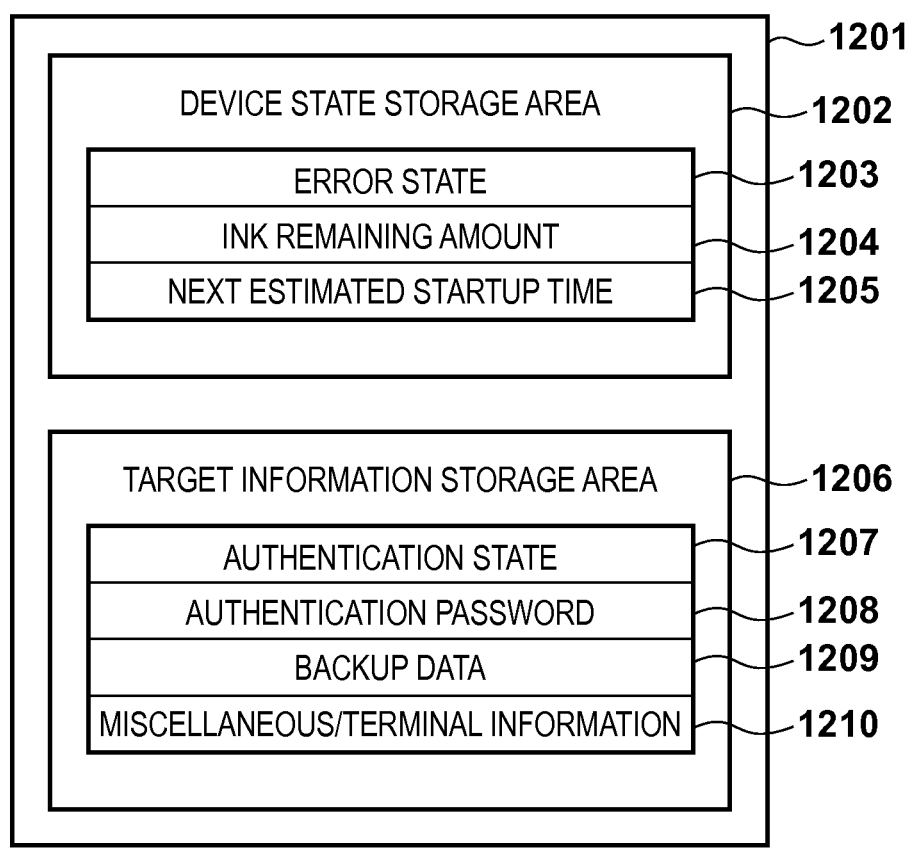
FIG. 12 is a view showing the configuration of an NFC memory of the MFP.

FIG. 12 shows the configuration of the NFC memory 905 of the MFP 300.

Reference numeral 1201 denotes an overall storage area of the NFC memory 905 of the MFP 300. To a device state storage area 1202, the contents of the device state storage area 1004 (FIG. 10) are coped at a predetermined timing. In FIG. 12, an error state 1203, ink remaining amount 1204, and next estimated startup time 1205 respectively correspond to the error state 1005, ink remaining amount 1006, and next estimated startup time 1007 shown in FIG. 10.

A target information storage area 1206 is an area used when a backup printing operation of the portable communication terminal apparatus 200 is executed. An authentication state 1207 stores an authentication state of the backup printing operation from the portable communication terminal apparatus 200. An authentication password 1208 as authentication information stores an authentication password received from the portable communication terminal apparatus 200. Backup data 1209 stores backup data of the portable communication terminal apparatus 200.

Miscellaneous/terminal information 1210 stores other kinds of terminal specific information such as a terminal name and user contact information.

Figure 13:
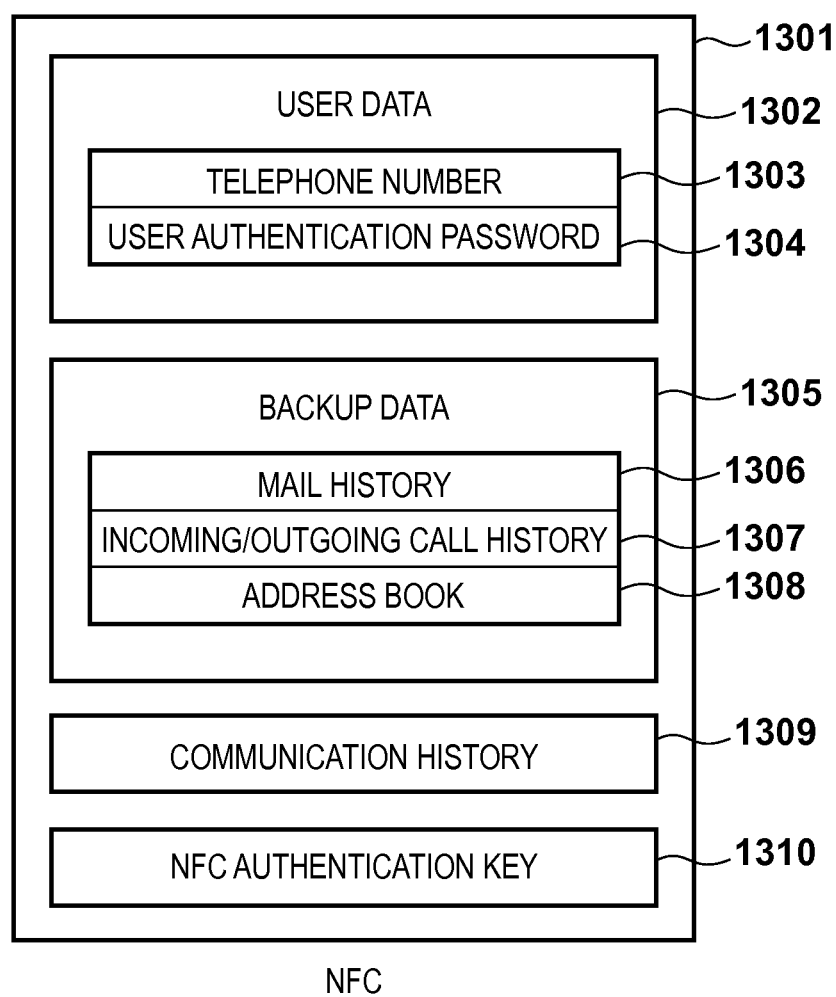
FIG. 13 is a view showing the configuration of an NFC memory of the portable communication terminal apparatus.

FIG. 13 shows the configuration of the NFC memory 905 of the portable communication terminal apparatus 200.

Reference numeral 1301 denotes an overall storage area of the NFC memory 905 of the portable communication terminal apparatus 200. User data 1302 stores a telephone number 1303, a user authentication password 1304 as authentication information of the backup printing function, and the like. Backup data 1305 stores data as backup targets. According to user settings, the backup data 1305 stores a mail history 1306, incoming/outgoing call history 1307, address book 1308, and the like. Even when a battery of the portable communication terminal apparatus 200 has no remaining amount, data in the NFC memory 905 can be read/written by executing authentication using an NFC authentication key 1310 in the predetermined sequence when the portable communication terminal apparatus 200 makes a communication as a target in the passive mode. In addition, information such as a NFC communication history 1309 is stored.

Figure 14:
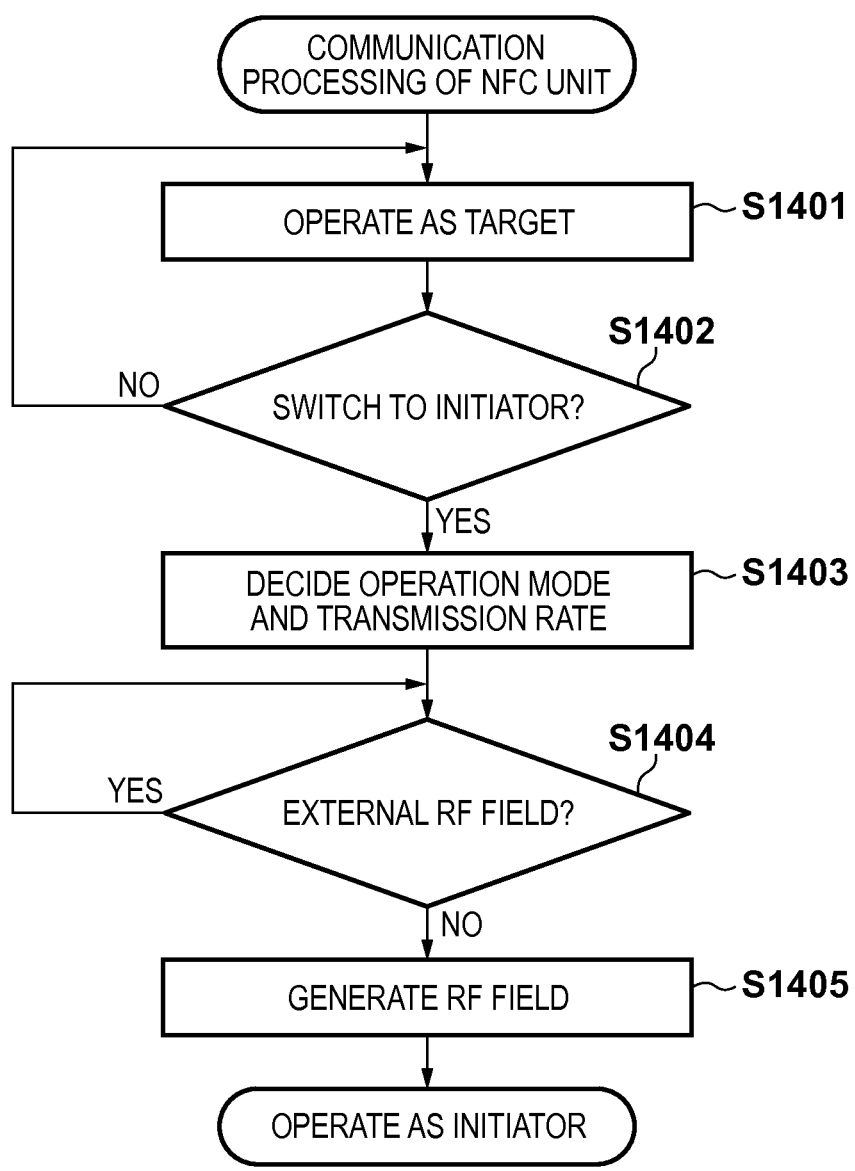
FIG. 14 is a flowchart required for the NFC unit to operate as an initiator.

FIG. 14 is a flowchart required for the NFC unit 900 to operate as an initiator.

Initially, in step S1401, all NFC units 900 operate as a target, and are set in a waiting state of a command from an initiator. In this case, each NFC unit 900 can be switched to an initiator in response to a request from an application, which controls communications based on the NFC standard. Then, the application determines in step S1402 whether or not the NFC unit 900 is switched to an initiator. If the NFC unit 900 is not switched to an initiator (NO in step S1402), the process returns to step S1401. On the other hand, if the NFC unit 900 is switched to an initiator in response to a switching request to an initiator (YES in step S1402), the process advances to step S1403.

In step S1403, the application of the NFC unit 900 selects one of the active mode and passive mode as an operation mode, and decides a transmission rate.

Next, in step S1404, the NFC unit 900 as the initiator detects an RF field generated by a device other than the self unit. That is, the NFC unit 900 determines whether or not an external RF field is detected. If an external RF field is detected (YES in step S1404), the initiator waits until no RF field is detected without generating a self RF field. On the other hand, if no external RF field is detected (NO in step S1404), the process advances to step S1405, and the NFC unit 900 as the initiator generates a self RF field. Via the aforementioned steps, the NFC unit 900 begins to operate as the initiator.

Figure 15:
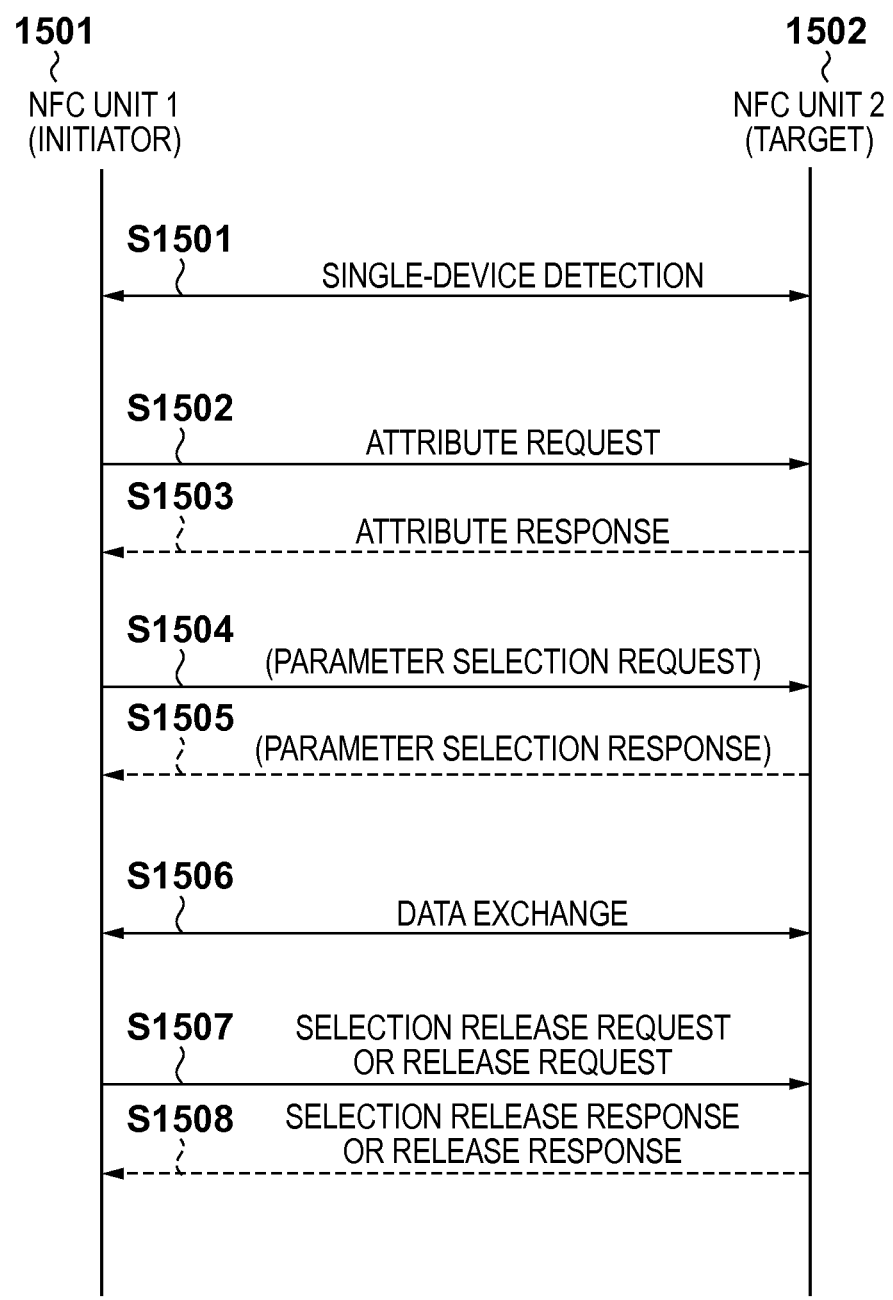
FIG. 15 is a chart showing the data exchange sequence in the passive mode.

FIG. 15 is a sequence chart of data exchange in the passive mode.

A case will be described below wherein a first NFC unit 1501 operates as an initiator, and a second NFC unit 1502 operates as a target.

In step S1501, the first NFC unit 1501 executes single-device detection to specify the second NFC unit 1502. Next, in step S1502, the first NFC unit 1501 transmits a self identifier, a bit transmission rate of transmission/reception, a valid data length, and the like as an attribute request. The attribute request has general bytes, and can be arbitrarily selected and used.

When the second NFC unit 1502 receives a valid attribute request, it transmits an attribute response in step S1503. In this case, transmission from the second NFC unit 1502 is attained by load modulation, and data transmission by load transmission is expressed by a dotted line arrow in FIG. 15.

In step S1504, after the first NFC unit 1501 confirms a valid attribute response, it transmits a parameter selection request to continuously change parameters of a transmission protocol. Parameters included in the parameter selection request are a transmission rate and valid data length.

When the second NFC unit 1502 receives a valid parameter selection request, it transmits a parameter selection response in step S1505, and changes the parameters. Note that steps S1504 and S1505 may be omitted if parameters are not changed.

In step S1506, the first and second NFC units 1501 and 1502 exchange data by a data exchange request and data exchange response. The data exchange request and response can transmit information for applications included in communication partners as data, and can divisionally transmit information when a data size is large.

Upon completion of data exchange, the first NFC unit 1501 transmits either a selection release request or release request in step S1507. When the first NFC unit 1501 transmits the selection release request, the second NFC unit 1502 transmits a selection release response in step S1508. Upon reception of the selection release request, the first NFC unit 1501 releases the attributes indicating the second NFC unit 1502, and the process returns to step S1501. When the first NFC unit 1501 transmits a release request, the second NFC unit 1502 transmits a release response and returns to an initial state in step S1508. When the first NFC unit 1501 receives the release response, it may return to an initial state since the target is completely released.

Figure 16:
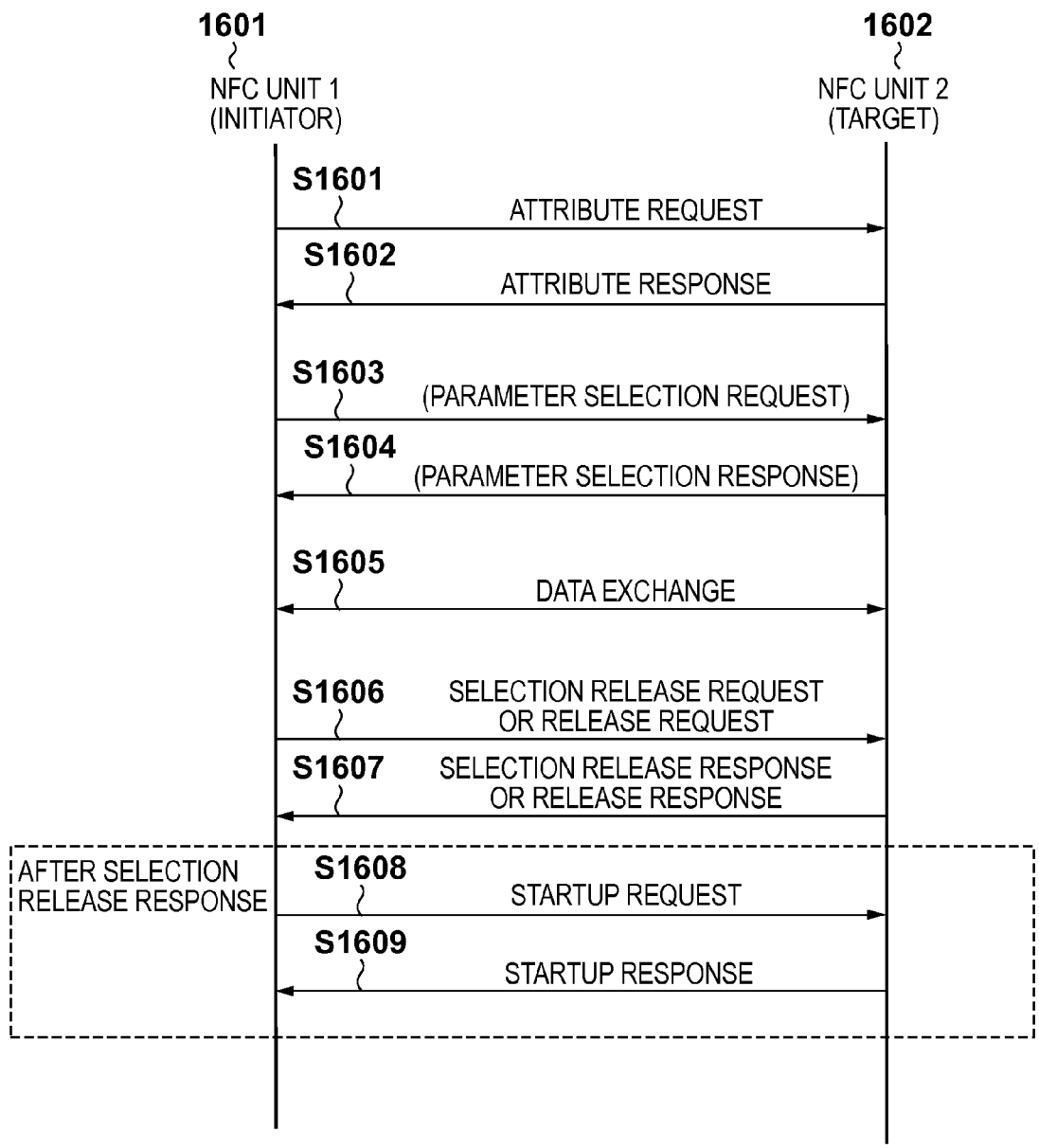
FIG. 16 is a chart showing the data exchange sequence in the active mode.

FIG. 16 is a sequence chart of data exchange in the active mode.

In FIG. 16, a case will be described below wherein a first NFC unit 1601 operates as an initiator, and a second NFC unit 1602 operates as a target.

In step S1601, the first NFC unit 1601 transmits a self identifier, a bit transmission rate of transmission/reception, a valid data length, and the like as an attribute request.

Upon reception of a valid attribute request, the second NFC unit 1602 transmits an attribute response in step S1602. In this case, transmission from the second NFC unit 1602 is attained by an RF field generated by itself. For this reason, the first and second NFC units 1601 and 1602 stop outputting an RF field after completion of data transmission.

After the first NFC unit 1601 confirms a valid attribute response, it transmits a parameter selection request to change parameters of a transmission protocol in step S1603. Parameters included in the parameter selection request are a transmission rate and valid data length.

Upon reception of a valid parameter selection request, the second NFC unit 1602 transmits a parameter selection response and changes the parameters in step S1604. Note that as in the passive mode, steps S1603 and S1604 may be omitted if the parameters are not changed.

In step S1605, the first and second NFC units 1601 and 1602 exchange data by a data exchange request and data exchange response. The data exchange request and response can transmit information for applications included in communication partners as data, and can divisionally transmit information when a data size is large.

Upon completion of data exchange, the first NFC unit 1601 transmits either a selection release request or release request in step S1606.

When the first NFC unit 1601 transmits the selection release request, the second NFC unit 1602 transmits a selection release response in step S1607. Upon reception of the selection release request, the first NFC unit 1601 releases the attributes indicating the second NFC unit 1602. After that, in step S1608, the first NFC unit 1601 transmits a startup request to another target, an identifier of which is given. A target, which received the startup request, transmits a startup response in step S1609, and the process returns to step S1601.

On the other hand, when the first NFC unit 1601 transmits the release request, the second NFC unit 1602 transmits a release response in step S1607. Upon reception of the release response, the first NFC unit 1601 transmits a release response in step S1608, and returns to an initial state. When the first NFC unit 1601 receives the release response, it may return to an initial state since the target is completely released.

Figure 17:
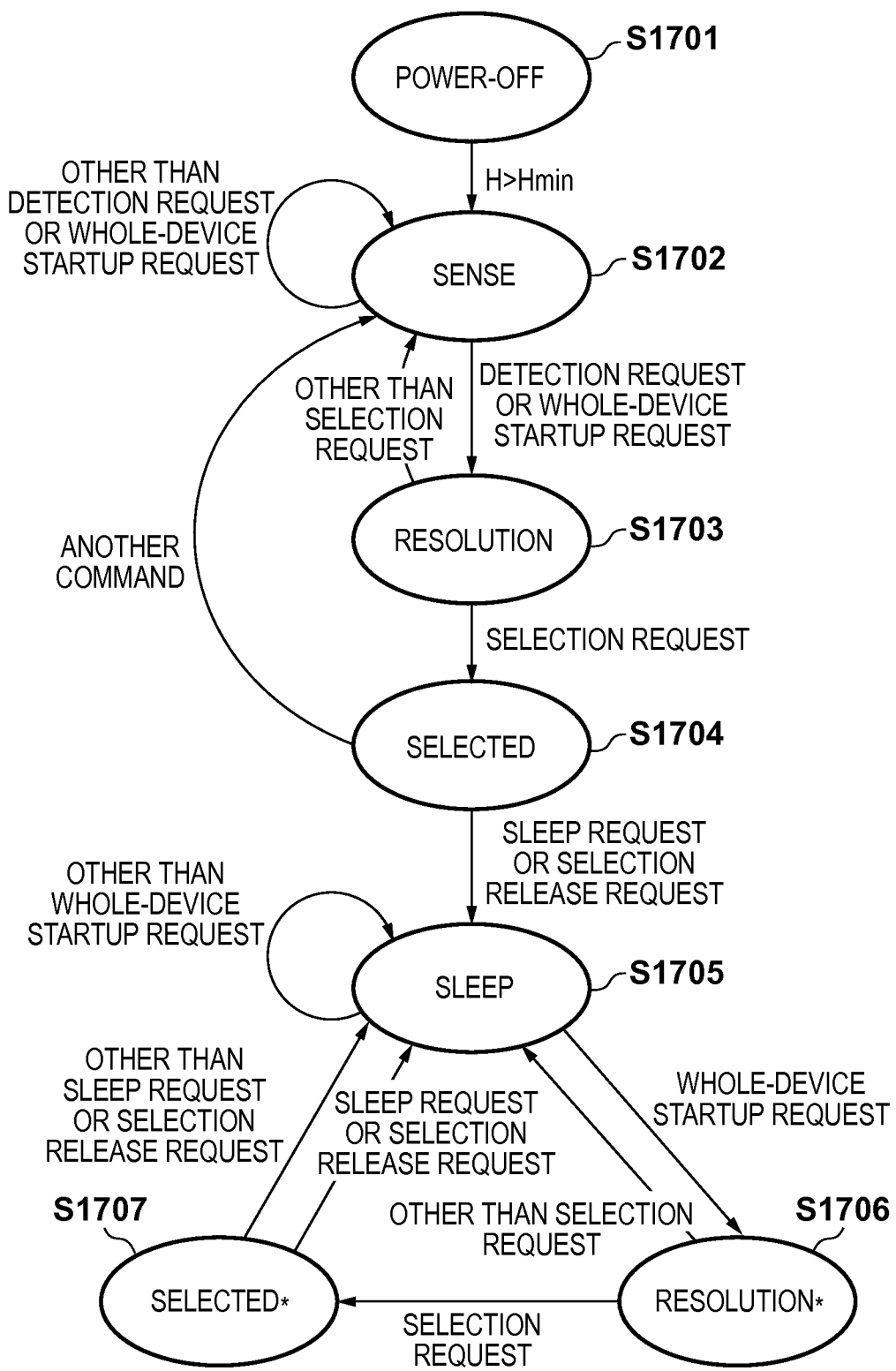
FIG. 17 is a chart showing the state transition of a target.

FIG. 17 shows state transitions of a target in the NFC.

A POWER-OFF state S1701 represents a power-off state. In this state S1701, when the target is placed in a magnetic field H larger than a threshold Hmin, it transits to a SENSE state S1702.

In the SENSE state S1702, the target waits for a command from an initiator. Upon reception of a detection request or whole-device startup request, the target transits to a RESOLUTION state S1703, and returns a detection response. Upon reception of another command, the target stays in the SENSE state S1702.

In the RESOLUTION state S1703, single-device detection is used. When a valid selection request is received as a result of the single-device detection, the target returns a selection response to an initiator, and transits to a SELECTED state S1704. Upon reception of another command, the target returns to the SENSE state S1702.

In the SELECTED state S1704, the target recognizes an attribute request, a parameter selection request, or a command of a valid unique specification.

Upon reception of a valid sleep request or selection release request, the target transits to a SLEEP state S1705. Upon reception of another command, the target returns to the SENSE state S1702.

Upon reception of a whole-device startup request, the target in the SLEEP state S1705 returns a detection response, and then transits to a RESOLUTION* state S1706. Upon reception of another command, the target stays in the SLEEP state S1705.

The RESOLUTION* state S1706 is nearly the same as the RESOLUTION state S1703, and single-device detection is used. Upon reception of a valid selection request, the target transits to a SELECTED* state S1707. Upon reception of another command, the target stays in the SLEEP state S1705.

The SELECTED* state S1707 is nearly the same as the SELECTED state S1704, and the target recognizes an attribute request, a parameter selection request, or a command of a valid unique specification. Upon reception of a valid sleep request or selection release request, the target transits to the SLEEP state. Upon reception of another command, the target falls back to the SLEEP state.

The backup printing function implemented using the NFC will be described below. The operation units of the portable communication terminal apparatus and MFP will be described first.

Figure 18:
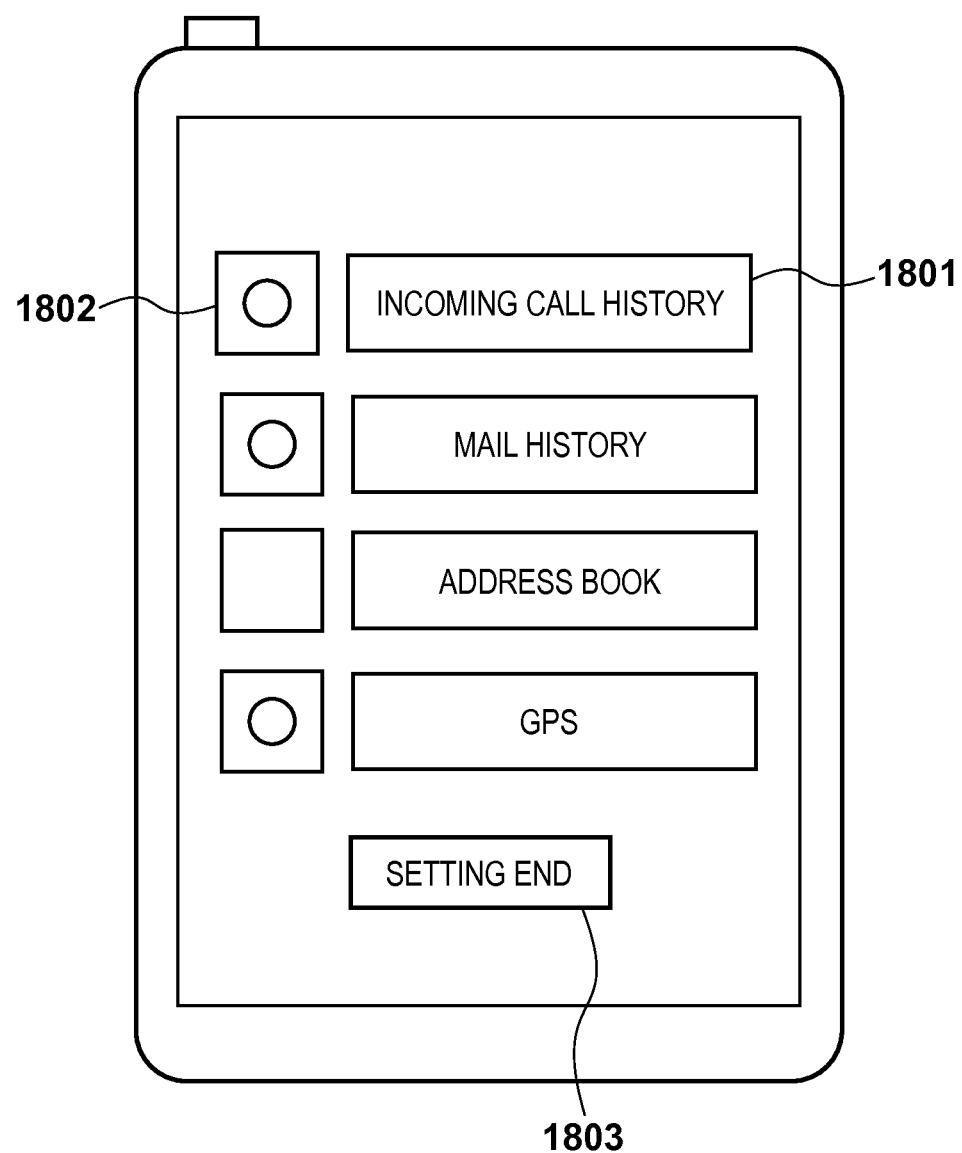
FIG. 18 is a view showing an example of a setting screen of the portable communication terminal apparatus.
Figure 19A:
FIG. 19A is a view showing an example of a UI displayed on the MFP.
Figure 19B:
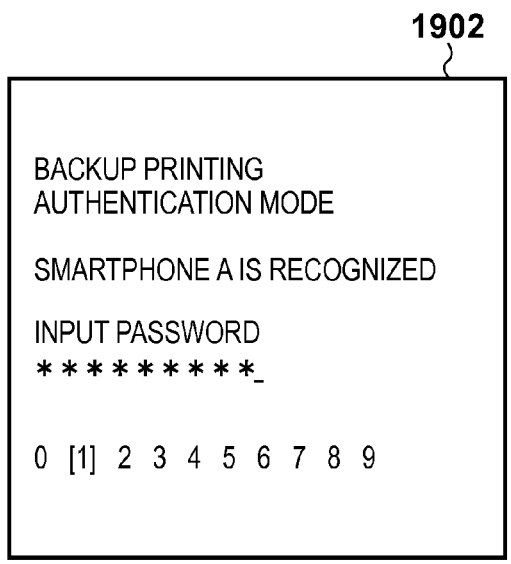
FIG. 19B is a view showing an example of a UI displayed on the MFP.
Figure 19C:
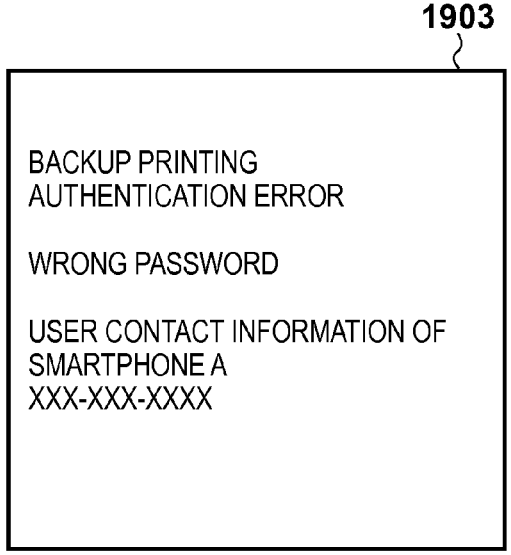
FIG. 19C is a view showing an example of a UI displayed on the MFP.
Figure 19D:
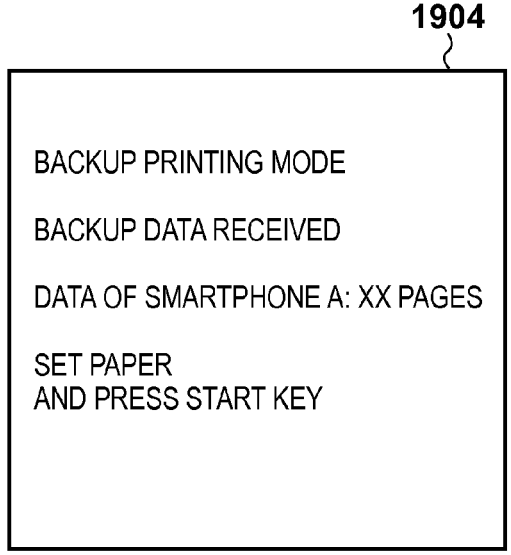
FIG. 19D is a view showing an example of a UI displayed on the MFP.

FIG. 18 shows a display example of a setting screen used to set backup items in the portable communication terminal apparatus 200.

Backup items 1801 correspond a list of information to be referred to when the portable communication terminal apparatus 200 loses any power supply. For the smartphone, the backup items 1801 correspond to the immediately preceding incoming call history and mail history, an address book, and the like. Each check box 1802 is checked when a corresponding backup item 1801 is selected as a backup target. A plurality of backup targets may be selected, and when backup items cannot be displayed within one frame, non-displayed backup items may be displayed by a scroll operation. FIG. 18 indicates that [incoming call history], [mail history], and [position information] are selected as items to be backed up. Upon completion of the selection operation, the user presses a setting end key 1803, thereby setting the backup targets in the RAM 704 of the portable communication terminal apparatus 200.

FIGS. 19A to 19D show display examples on the display unit 406 of the MFP 300.

Upon reception of an instruction of the backup printing function, the MFP 300 controls the NFC unit 818 to operate in the passive mode. The MFP 300 operates as an initiator, and displays a backup printing standby screen 1901. When the MFP 300 recognizes the portable communication terminal apparatus 200 as a target, it displays a backup printing authentication screen 1902. The MFP 300 accepts a password input by detecting pressing of the four-way selector 401 and set key 402. When the password authentication has failed, the MFP 300 displays a backup printing authentication failure screen 1903. The backup printing authentication failure screen 1903 displays contact information of an owner of the portable communication terminal apparatus 200 and the like. On the other hand, when the password authentication has succeeded, the MFP 300 displays a backup printing screen 1904. Subsequently, the MFP 300 shapes data received from the portable communication terminal apparatus 200, and displays the number of pages. After that, the MFP 300 detects pressing of the start key 404, and starts a printing operation of backup data.

FIG. 20 shows an example of a case in which an MFP 2002 serves as an initiator and prints backup data stored in the NFC memory 905 of a portable communication terminal apparatus 2001 to which no electric power is supplied.

In step S2001, in order to establish an NFC communication, an NFC communication unit 2004 of the MFP 2002 serves as an initiator, and detects an NFC communication unit 2003 of the portable communication terminal apparatus 2001 as a target. When the NFC communication unit 2003 is normally detected, the NFC communication unit 2003 transmits a detection response in step S2002. When the detection response is normally detected, the NFC communication unit 2004 transmits an attribute request required to make the NFC communication in step S2003. Upon reception of the attribute request, the NFC communication unit 2003 returns an attribute response in step S2004. In this case, the attribute request and response respectively transmit NFC IDs of the initiator and target, and the initiator and target specify communication partners using these NFC IDs. In step S2005, the NFC communication unit 2004 executes mutual authentication with the NFC communication unit 2003, and can pass an encryption key and the like required for data encryption. Note that when an encryption key need not be passed, this mutual authentication may be skipped.

After that, in step S2006, a backup printing application unit 2005 requests the NFC communication unit 2004 to transmit a password. Upon reception of the request, the NFC communication unit 2004 requests the NFC communication unit 2003 to transmit a password in step S2007. Upon reception of the password request, the NFC communication unit 2003 notifies a user authentication password stored in the NFC memory 905 in step S2008. Upon reception of a password response, the NFC communication unit 2004 notifies the backup printing application unit 2005 of the password in step S2009.

The backup printing application unit 2005, which received the password, requests an operation unit 2006 to transmit a password input by the user in step S2010. The operation unit 2006 prompts the user to input a password. When the password is input, the operation unit 2006 returns the password to the backup printing application unit 2005 in step S2011. In step S2012, the backup printing application unit 2005 collates the passwords.

When the password collation has succeeded, the backup printing application unit 2005 requests the NFC communication unit 2004 to transmit backup data in step S2013. The NFC communication unit 2004 requests the NFC communication unit 2003 to transmit the backup data in step S2014. Upon reception of the request, the NFC communication unit 2003 transmits the backup data in step S2015. The NFC communication unit 2004 notifies the backup printing application unit 2005 of the backup data in step S2016, and the backup printing application unit 2005 enters the printing sequence of the backup data.

FIGS. 21A to 21D are flowcharts showing processing examples until the portable communication terminal apparatus 200 saves backup data in the NFC memory 905 on the NFC unit 900 of the MFP 300. In the processes shown in FIGS. 21A to 21D, data to be stored in the NFC memory 905 of those managed in the portable communication terminal apparatus 200 are specified. Then, the specified data are stored in the NFC memory 905 as backup data.

Note that various kinds of information such as an address book, mail history, and incoming/outgoing call history, which are backup data candidates, are stored in the non-volatile memory 722 of the portable communication terminal apparatus 200.

Figure 21A:
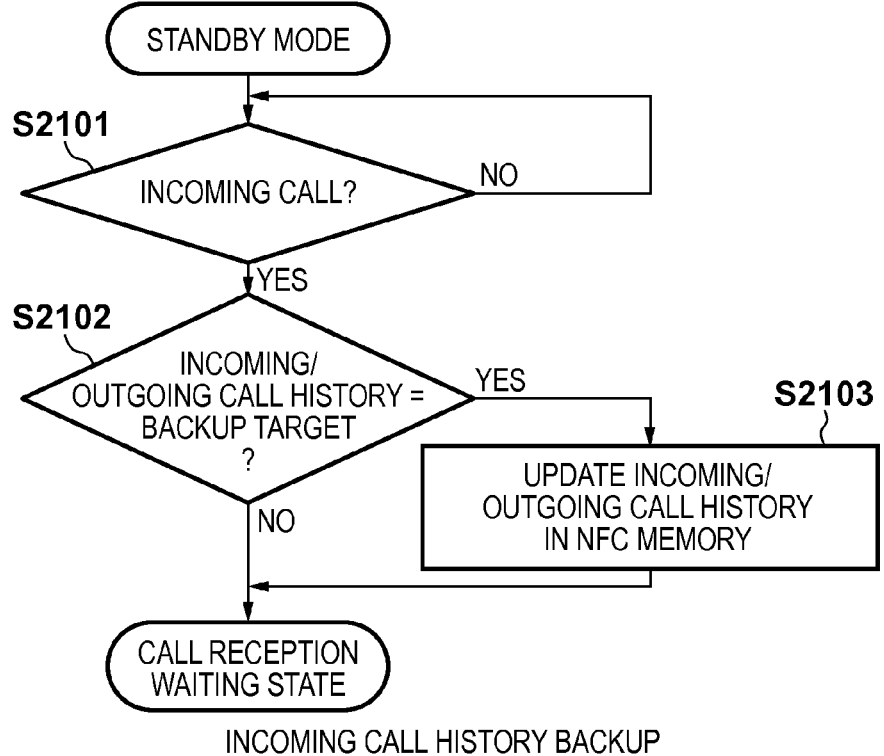
FIG. 21A shows an example of a flowchart when a portable communication terminal apparatus 200 executes a backup operation.

FIG. 21A shows an example of a flowchart of the sequence for backing up an incoming call history upon reception of an incoming call. The portable communication terminal apparatus 200 is set in a standby mode after information as a backup target is set. In step S2101, the portable communication terminal apparatus 200 detects an incoming call. If an incoming call is detected (YES in step S2101), the portable communication terminal apparatus 200 determines in step S2102 whether or not an incoming call history is a backup target. If an incoming/outgoing call history is a backup target (YES in step S2102), the portable communication terminal apparatus 200 specifies a telephone number of the incoming call detected in step S2101 as a storage target to be stored in the NFC memory 905, and stores the telephone number as the storage target to be stored in the NFC memory 905, thereby updating the incoming/outgoing call history stored in the NFC memory 905 in step S2103. After that, the portable communication terminal apparatus is set in a call reception waiting state until the user accepts a communication.

Figure 21B:
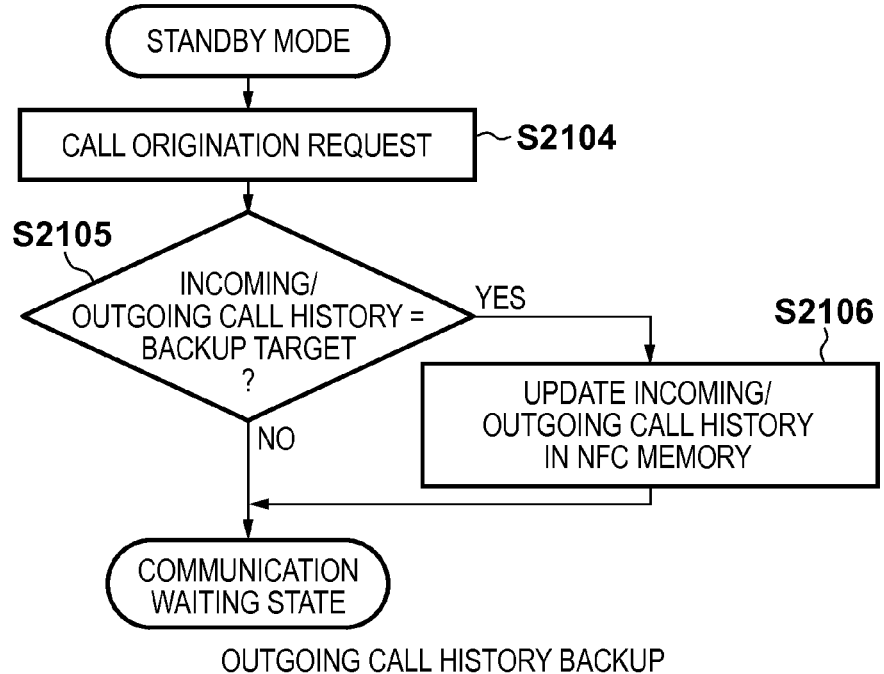
FIG. 21B shows an example of a flowchart when the portable communication terminal apparatus 200 executes a backup operation.
Figure 21C:
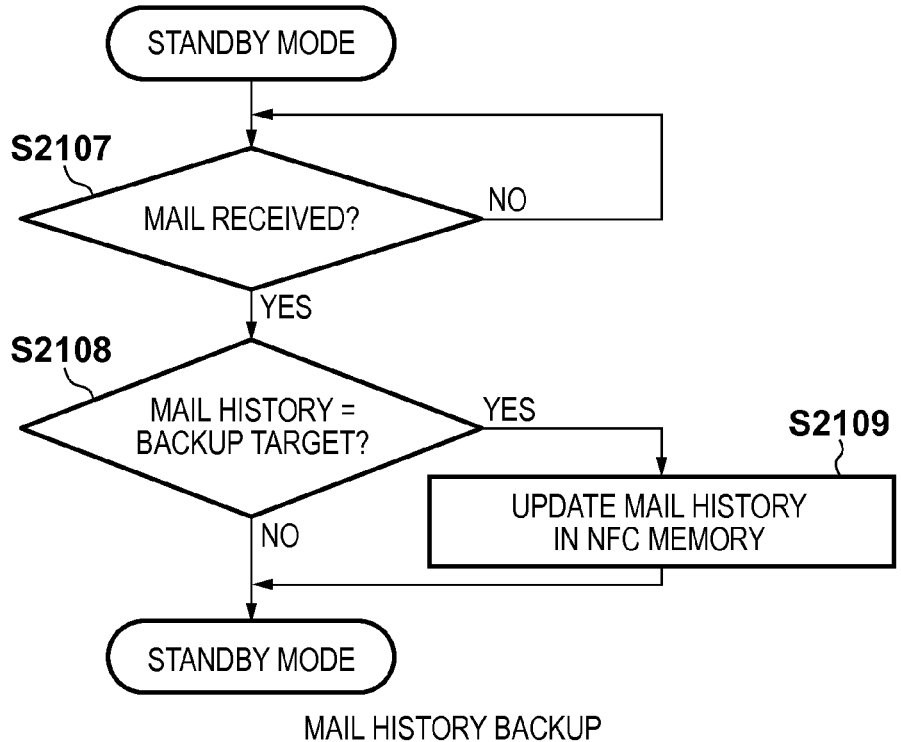
FIG. 21C shows an example of a flowchart when the portable communication terminal apparatus 200 executes a backup operation.
Figure 21D:
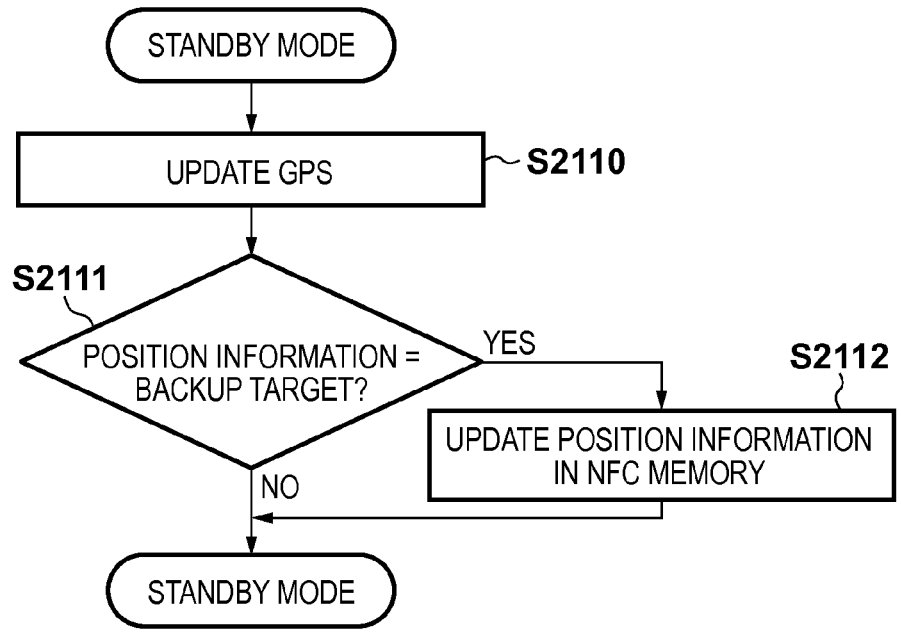
FIG. 21D shows an example of a flowchart when the portable communication terminal apparatus 200 executes a backup operation.

FIGS. 21B to 21D have the same processing contents as in FIG. 21A except for backup targets. FIGS. 21B to 21D respectively show cases when an outgoing call history, mail history, and position information are backup targets. For example, if a call origination request is input in step S2104, a number of that call to be originated is saved in the NFC memory 905. On the other hand, if a mail message is received in step S2107, at least one of a mail address of a sender of that mail message and the contents (text and image) of the mail message is saved in the NFC memory 905. Note that not only when a mail message is received but also when a mail message is sent, a destination mail address or contents of the mail message may be saved. Furthermore, if GPS position information is updated in step S2110, that position information is saved in the NFC memory 905.

In this manner, data as a backup target is not limited to an incoming call history, and it may be mail reception or any other kinds of information which are passively notified by an application on the portable communication terminal apparatus 200. Also, data to be saved of backup targets may be further limited. For example, of incoming calls, only numbers of higher frequencies may be saved, or only numbers registered in an address book may be saved.

Figure 22:
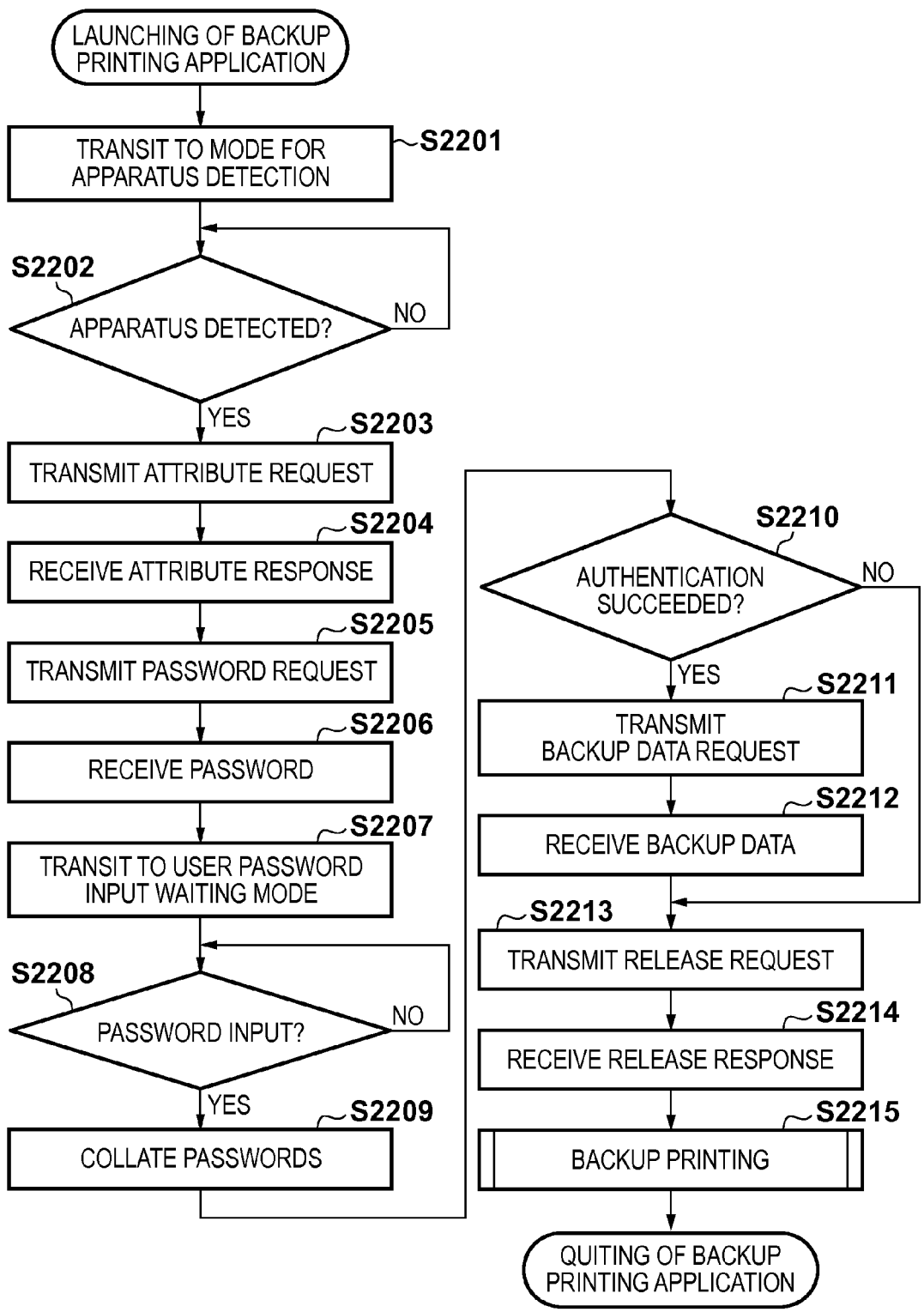
FIG. 22 is a flowchart showing data exchange on the MFP side.

FIG. 22 shows an example of a flowchart of data exchange on the MFP 300 side.

This processing is an example of processing executed until the MFP 300 launches a backup printing application, authenticates whether or not an application user is an owner of a target, and acquires and prints backup data.

Note that this backup printing application has an interface which is required for the user to input a password and is used to print backup data, a function of controlling the NFC unit to operate as an initiator, and the like.

After the backup printing application is launched, the MFP 300 serves as an initiator, and transits to a mode for detecting a communication partner apparatus, that is, the NFC unit 900 as a target in step S2201. The communication mode of the target has to be the passive mode so as to allow NFC communications even when no electric power is supplied. As described above, when the target makes communications in the passive mode, the target receives electric power from another NFC device by electromagnetic induction by receiving carriers (or electromagnetic waves) from that NFC device, and communicates with the NFC device by modulating carriers (or electromagnetic waves), thereby exchanging data. For this reason, even when no electric power is supplied to the target, NFC communications can be made.

In step S2202, the MFP 300 detects a communication partner apparatus (target). If no communication partner apparatus is detected (NO in step S2202), the MFP 300 stands by until a communication partner apparatus is detected. On the other hand, if a communication partner apparatus is detected (YES in step S2202), the process advances to step S2203. Note that a time required to detect an apparatus, and the number of times of detection depend on the backup printing application, and the detection may be interrupted after an elapse of a predetermined time or after the predetermined number of times of detection, or the user may explicitly instruct to interrupt the detection.

In step S2203, the MFP 300 transmits an attribute request to the detected target. In step S2204, the MFP 300 receives an attribute response from the target. In this case, when a normal response cannot be obtained, the MFP 300 transmits a parameter selection request again or may abort the communication. When a normal response can be obtained, the process advances to step S2205.

In step S2205, the MFP 300 transmits a password request to the target. In step S2206, the MFP 300 receives a password from the target. Upon reception of the password from the target, the MFP 300 transits to a password input waiting mode of the user in step S2207. The MFP 300 determines in step S2208 whether or not the password is input. If no password is input (NO in step S2208), the MFP 300 waits until the password is input. On the other hand, if the password is input (YES in step S2208), the process advances to step S2209. In this case, a password format depends on the backup printing application, and may be a character string or number or may be fingerprint information or the like as long as an input from the user can be collated.

In step S2209, the MFP 300 collates the password (first password) received from the target in step S2206 and that (second password) input in step S2208. The MFP 300 determines in step S2210 whether or not the collation (authentication) has succeeded. That is, the MFP 300 determines whether or not the first and second passwords match. If the authentication has failed (NO in step S2210), the process jumps to step S2213. On the other hand, if the authentication has succeeded (YES in step S2210), the process advances to step S2211.

In step S2211, the MFP 300 transmits a backup data request to the target. In step S2212, the MFP 300 receives backup data from the target. Upon reception of the backup data from the target, the MFP 300 transmits a release request to the target in step S2213. In step S2214, the MFP 300 receives a release response from the target, thereby releasing the target. The target may be released after backup printing, but it is desirable that a detection failure of the target during printing does not influence a print result. After that, in step S2215, the MFP 300 transits to processing for printing the backup data received in step S2212, thus quitting the backup printing application.

Figure 23:
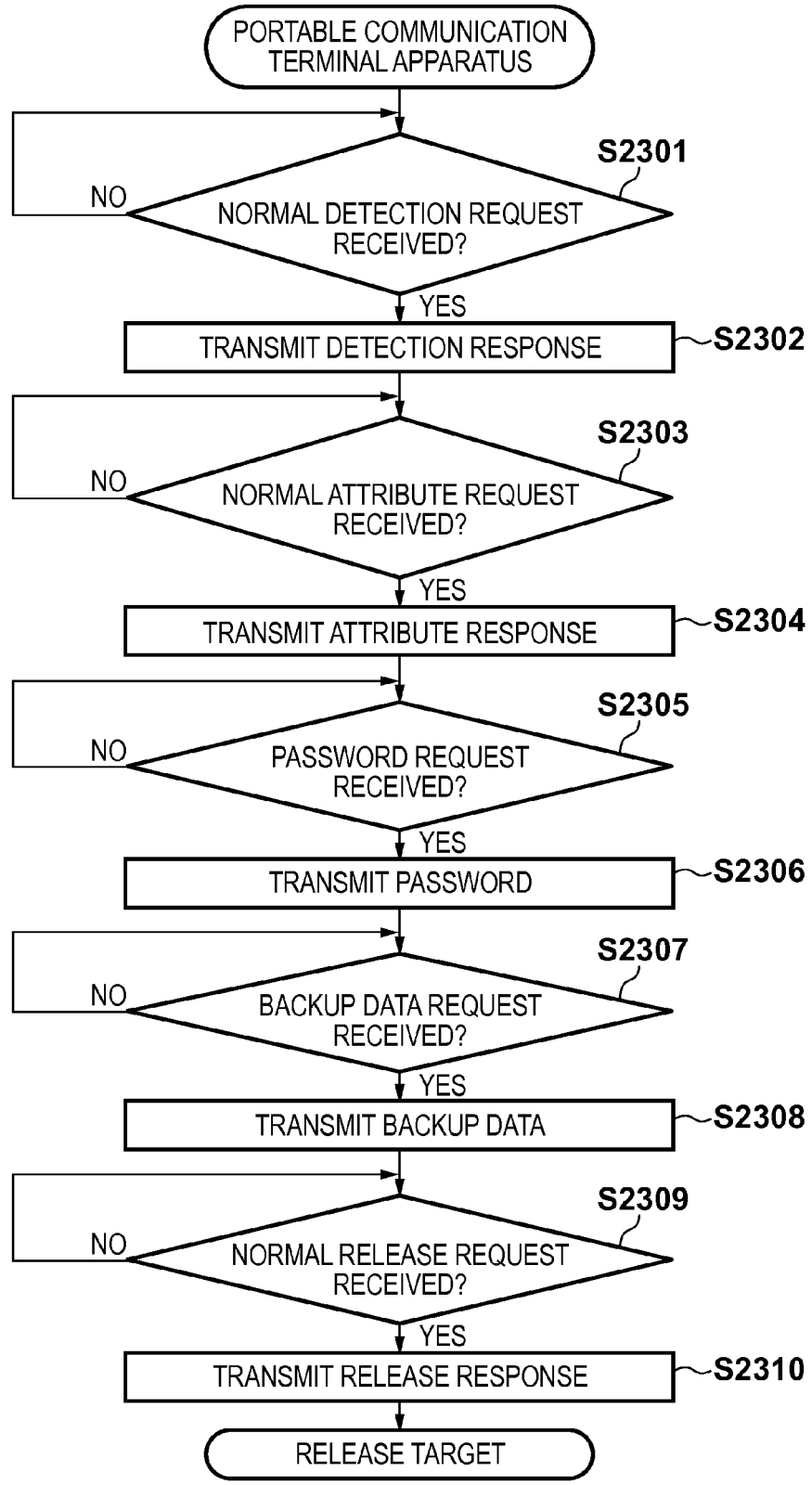
FIG. 23 is a flowchart showing data exchange on the portable communication terminal apparatus side.

FIG. 23 shows an example of a flowchart of data exchange on the portable communication terminal apparatus 200 side.

This processing is an example of processing from when the portable communication terminal apparatus 200 receives a detection request of the MFP 300 until it closes NFC communication. The communication mode in this case is the passive mode so as to allow NFC communications even when no electric power is supplied to the portable communication terminal apparatus 200 (power failure state). When the portable communication terminal apparatus 200 operates in the passive mode, it receives electric power supplied from another NFC device by electromagnetic induction by receiving carriers (or electromagnetic waves) from the MFP 300, and communicates with that NFC device by modulating carriers (or electromagnetic waves), thereby exchanging data. For this reason, even when no electric power is supplied to the portable communication terminal apparatus 200, the portable communication terminal apparatus 200 can transmit data to the MFP 300.

The portable communication terminal apparatus 200 determines in step S2301 whether or not a normal detection request is received from the MFP 300 as an initiator. If no normal detection request is received (NO in step S2301), the portable communication terminal apparatus 200 waits until a normal detection request is received. On the other hand, if a normal detection request is received (YES in step S2301), the process advances to step S2302.

In step S2302, the portable communication terminal apparatus 200 transmits a detection response to the initiator. The portable communication terminal apparatus 200 determines in step S2303 whether or not a normal attribute request is received. If no normal attribute request is received (NO in step S2303), the portable communication terminal apparatus 200 waits until a normal attribute request is received. On the other hand, if a normal attribute request is received (YES in step S2303), the process advances to step S2304.

In step S2304, the portable communication terminal apparatus 200 transmits an attribute response to the initiator. After transmission of the attribute response, the portable communication terminal apparatus 200 determines in step S2305 whether or not a normal password request is received. If no normal password request is received (NO in step S2305), the portable communication terminal apparatus 200 waits until a normal password request is received. On the other hand, if a normal password request is received (YES in step S2305), the process advances to step S2306.

In step S2306, the portable communication terminal apparatus 200 transmits a password response to the initiator. After that, the portable communication terminal apparatus 200 determines in step S2307 whether or not a backup data request is received. If no backup data request is received (NO in step S2307), the portable communication terminal apparatus 200 waits until a backup data request is received. On the other hand, if a backup data request is received (YES in step S2307), the process advances to step S2308.

In step S2308, the portable communication terminal apparatus 200 reads out backup data stored in the NFC memory 905, and transmits the readout backup data to the initiator. After that, the portable communication terminal apparatus 200 determines in step S2309 whether or not a normal release request is received. If no normal release request is received (NO in step S2309), the portable communication terminal apparatus 200 waits until a normal release request is received. On the other hand, if a normal release request is received (YES in step S2309), the process advances to step S2310, and the portable communication terminal apparatus 200 transmits a release response to the initiator, thus closing the NFC communications.

Figure 24:
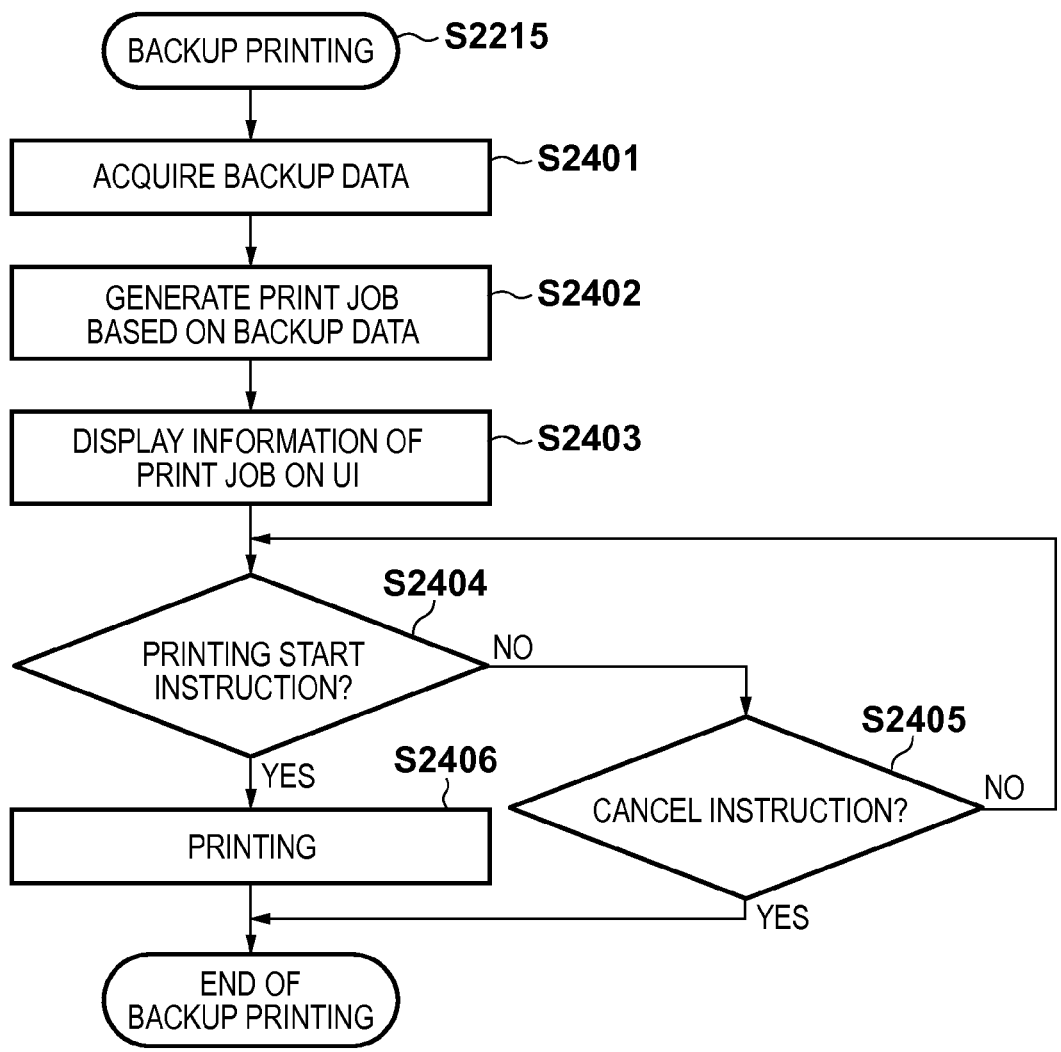
FIG. 24 is a flowchart of backup printing executed by the MFP.

FIG. 24 shows an example of the backup printing in step S2215 in FIG. 22.

In step S2401, the MFP 300 acquires backup data from the target via the NFC communications. A data format of the backup data depends on the application, and is not particularly limited. The standard may be defined between the MFP 300 and portable communication terminal apparatus 200, or data may be exchanged using a general format such as text or xml.

In step S2402, the MFP 300 generates a print job based on the backup data. A print job generation method depends on the application. When the backup data is an incoming call history or mail history, text data may be formed. Alternatively, when the backup data is GPS information, a surrounding map may be received based on the GPS information from a network, and an image may be formed. In addition, a print job including a plurality of pages may be formed or that within one page may be formed.

Upon completion of generation of the print job, the MFP 300 displays information of the print job on a UI displayed on the display unit 811 in step S2403. In this case, as the information of the print job, the MFP 300 notifies the user of information required to start printing (for example, the number of pages of the job).

After that, in steps S2404 and S2405, the MFP 300 waits until a print start instruction or cancel instruction is received. If a print start instruction is received in step S2404 (YES in step S2404), the process advances to step S2406, and the MFP 300 prints the backup data, thus ending the backup printing processing. On the other hand, if a cancel instruction is received in step S2405 (YES in step S2405), the MFP 300 ends the backup printing processing without printing the backup data.

FIGS. 25A and 25B show examples of output results of the backup printing.

FIG. 25A shows an example when an incoming call history is output. FIG. 25B shows an example when a received mail history is output. Layouts are not limited to the illustrated examples, and images may be displayed or both the call history and received mail history may be laid out on a single sheet surface together. This embodiment has exemplified the printing apparatus. However, an output method of the backup data is not limited to a sheet surface output. For example, an apparatus which received backup data may display the received data on an independent display device. Also, according to the present invention, the backup data can be transmitted to another portable communication terminal in place of the printing apparatus. The portable communication terminal which received the backup data can immediately originate a call to backed-up contact information, and such arrangement is effective in an emergency state.

As described above, even when no electric power is supplied to a portable communication terminal, backup information can be output from an output apparatus, and the user can immediately contact using an alternate device from information such as a mail history or call history.

As described above, according to this embodiment, for example, when the battery of a smartphone is dead or when the smartphone has gone down and can no longer be started, information such as a call history, address book, and mail history can be immediately output using a public printing apparatus or display device. Since the user who uses this function is not an owner of the smartphone, the user authentication is executed, and only when the user is authenticated, information can be output.

The present invention is applicable to a wireless communication apparatus and wireless communication system and, more particularly, to an apparatus which can make short distance wireless communication, establishment of peer-to-peer connection between such apparatuses, and a wireless communication system of these apparatuses.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-048623, filed on Mar. 5, 2012 which is hereby incorporated by reference herein in its entirety.

What is claimed is:

1. A system that includes a communication apparatus which includes a first close proximity wireless communication circuit which makes a communication based on Near Field Communication (NFC) and an output apparatus which includes a second close proximity wireless communication circuit which makes a communication based on the NFC,
wherein the communication apparatus further comprises a processor for controlling a saving unit configured to save, in a non-volatile memory that is comprised in the first close proximity wireless communication circuit and thereby capable of being accessed when a battery comprised in the communication apparatus is dead or empty, backup data obtained from a function that does not utilize the NFC, wherein the backup data is managed in the communication apparatus and is specified as a backup target, and save first user authentication information, wherein the output apparatus further comprises a processor for controlling a controlling unit, an input unit, a receiving unit and an information output unit, wherein the controlling unit controls the second close proximity wireless communication circuit to transition from a target of the NFC to an initiator of the NFC in response to activation of a backup output function, wherein the input unit accepts an input of second user authentication information from a user, wherein the receiving unit receives, via the second close proximity wireless communication circuit, the backup data and the first user authentication information saved in the non-volatile memory by the saving unit, in a case where the communication apparatus is in a state in which the battery comprised in the communication apparatus is dead or empty and the first close proximity wireless communication circuit is a target of the NFC; and wherein the information output unit outputs information based on the backup data received by the receiving unit under a condition where the first user authentication information received by the receiving unit matches the second user authentication information accepted as the input by the inputting unit.

2. The system according to claim 1, wherein the processor in the communication apparatus sets a type of data to be determined as the backup target in accordance with a user instruction, and determines that data of the set type is the backup target.

3. The system according to claim 1, wherein the first close proximity wireless communication circuit reads out data from the non-volatile memory by electric power supplied to the first close proximity wireless communication circuit based on electromagnetic waves received from the second close proximity wireless communication circuit of the output apparatus in a state in which the battery comprised in the communication apparatus is dead or empty, and outputs the readout data to the output apparatus.

4. The system according to claim 3, wherein when the first close proximity wireless communication circuit is a target of the NFC and the second close proximity wireless communication circuit of the output apparatus is the initiator of the NFC and when a communication between the target and the initiator is a passive mode of the NFC, the first close proximity wireless communication circuit transmits data saved in the non-volatile memory to the output apparatus.

5. The system according to claim 1, wherein the communication apparatus comprises a function using a telephone line as the function that does not utilize the NFC, and when the function detects an incoming call or an outgoing call and the communication apparatus acquires a telephone number corresponding to the incoming call or the outgoing call, the processor determines that the telephone number is the backup target.

6. The system according to claim 1, wherein the communication apparatus comprises a mail function as the function that does not utilize the NFC, and when the mail function transmits or receives a mail message and the communication apparatus acquires at least one of a mail address corresponding to transmitted or received mail message and contents of the mail message, the processor determines that the mail address or the contents is the backup target.

7. The system according to claim 1, wherein the output apparatus is a printer, and the information outputting unit prints out the information based on the backup data.

8. The system according to claim 1, wherein the communication apparatus comprises a display unit capable of displaying information and the output apparatus comprises a print unit capable of printing information, and wherein the state in which the battery comprised in the communication apparatus is dead or empty is a state in which the display unit falls in a state of incapable of displaying information, but a state in which the backup data saved in the non-volatile memory is capable of being printed by the output apparatus via the NFC.

9. A control method of a system that includes a communication apparatus which includes a first close proximity wireless communication circuit which makes a communication based on a Near Field Communication (NFC) and an output apparatus which includes a second close proximity wireless communication circuit which makes a communication based on the NFC, the method comprising:

saving, by the communication apparatus, in a non-volatile memory that is comprised in the first close proximity wireless communication circuit and thereby capable of being accessed when a battery comprised in the communication apparatus is dead or empty, backup data obtained from a function that does not utilize the NFC, wherein the backup data is managed in the communication apparatus and is specified as a backup target and saving first user authentication information, and controlling, by the output apparatus, the second close proximity wireless communication circuit to transition from a target of the NFC to an initiator of the NFC in response to activation of a backup output function, receiving, by the output apparatus, in a case where the communication apparatus is in a state in which the battery comprised in the communication apparatus is dead or empty and the first close proximity wireless communication circuit is a target of the NFC, the first user authentication information that is saved in the non-volatile memory, via the second close proximity wireless communication circuit that has transitioned to the initiator;

accepting, by the output apparatus, an input of second user authentication information from a user, receiving, by the output apparatus, the backup data saved in the non-volatile memory via the second close proximity wireless communication circuit under a condition where the first user authentication information received matches the second user authentication information accepted as the input; and outputting, by the output apparatus, information based on the backup data received.

10. The method according to claim 9, further comprising setting, by the communication apparatus, a type of data to be determined as the backup target in accordance with a user instruction, wherein data of the set type is determined as the backup target.

11. The method according to claim 9, wherein the first close proximity wireless communication circuit reads out data from the non-volatile memory by electric power supplied to the first close proximity wireless communication circuit based on electromagnetic waves received from the second close proximity wireless communication circuit of the output apparatus in a state in which the battery comprised in the communication apparatus is dead or empty, and outputs the readout data to the output apparatus.

12. The method according to claim 11, wherein when the first close proximity wireless communication circuit is a target of the NFC and the second close proximity wireless communication circuit of the output apparatus is initiator of the NFC and when a communication between the target and the initiator is a passive mode of the NFC, the first close proximity wireless communication circuit transmits data saved in the non-volatile memory to the output apparatus.

13. The method according to claim 9, wherein the communication apparatus comprises a function using a telephone line as the function that does not utilize the NFC, and, when the function detects an incoming call or an outgoing call and the communication apparatus acquires a telephone number corresponding to the incoming call or the outgoing call, the telephone number is determined as the backup target.

14. The method according to claim 9, wherein the communication apparatus comprises a mail function as the function that does not utilize the NFC, and when the mail function transmits or receives a mail message and the communication apparatus acquires at least one of a mail address corresponding to the transmitted or received mail message and contents of the mail message, the at least one of the mail address or the contents is determined as the backup target.

15. The method according to claim 9, wherein the output apparatus is a printer, and the information is printed out by the output apparatus based on the backup data.

16. The method according to claim 9, wherein the communication apparatus comprises a display unit capable of displaying information and the output apparatus comprises a print unit capable of printing information, and wherein the state in which the battery comprised in the communication apparatus is dead or empty is a state in which the display unit falls in a state of incapable of displaying information, but a state in which the backup data saved in the non-volatile memory is capable of being printed by the output apparatus via the NFC.

* * * * *